US012664893B2

(12) United States Patent
Agarwal

(10) Patent No.: US 12,664,893 B2
(45) Date of Patent: Jun. 23, 2026

(54) SYSTEM AND METHOD FOR COORDINATING COLLABORATIVE SENSOR CALIBRATION

(71) Applicant: PlusAI, Inc., Santa Clara, CA (US)

(72) Inventor: Ankur Agarwal, Cupertino, CA (US)

(73) Assignee: PlusAI, Inc., Santa Clara, CA (US)

( * ) Notice: Subject to any disclaimer, the term of this patent is extended or adjusted under 35 U.S.C. 154(b) by 198 days.

(21) Appl. No.: 18/534,011

(22) Filed: Dec. 8, 2023

(65) Prior Publication Data

US 2024/0112583 A1 Apr. 4, 2024

Related U.S. Application Data

(63) Continuation of application No. 16/707,028, filed on Dec. 9, 2019, now Pat. No. 11,875,682.

(51) Int. Cl.
| | |
|---|---|
| *G05D 1/00* | (2024.01) |
| *G05D 1/228* | (2024.01) |
| *G05D 1/646* | (2024.01) |
| *G06F 16/29* | (2019.01) |
| *G08G 1/00* | (2006.01) |

(Continued)

(52) U.S. Cl.
CPC ............. *G08G 1/20* (2013.01); *G05D 1/0088* (2013.01); *G05D 1/0212* (2013.01); *G05D 1/228* (2024.01); *G05D 1/646* (2024.01); *G06F 16/29* (2019.01); *G16Y 40/10* (2020.01); *G16Y 40/20* (2020.01)

(58) Field of Classification Search
None
See application file for complete search history.

(56) References Cited

U.S. PATENT DOCUMENTS

| | | | |
|---|---|---|---|
| 9,201,424 | B1 | 12/2015 | Ogale |
| 10,796,453 | B1 | 10/2020 | Yan et al. |
| 11,087,496 | B2 | 8/2021 | Agarwal |

(Continued)

FOREIGN PATENT DOCUMENTS

| | | |
|---|---|---|
| DE | 102017217212 A1 | 3/2019 |
| WO | 2019/202317 A1 | 10/2019 |

OTHER PUBLICATIONS

Office Action dated Apr. 12, 2024 for Chinese Application No. 202011448626.0, 9 pages.

(Continued)

*Primary Examiner* — James M McPherson
(74) *Attorney, Agent, or Firm* — Rimon Law, P.C.

(57) ABSTRACT

The present teaching relates to method, system, medium, and implementations for sensor calibration. A request is received from an ego vehicle in motion for assistance in collaborative calibration, when the ego vehicle determines that a sensor deployed thereon needs to be calibrated. The request includes at least one of a first position of the ego vehicle and a first configuration of the sensor with respect to the ego vehicle. An assisting vehicle is identified based on the first position, the first configuration, and a second position associated with the assisting vehicle and an assistance plan is generated in response to the request indicative of the assisting vehicle to travel to the ego vehicle to facilitate the calibration of the sensor by collaborating with the moving ego vehicle. Such generated assistance plan is then sent out to initiate the collaborative calibration.

20 Claims, 40 Drawing Sheets

(51) Int. Cl.
   *G16Y 40/10*          (2020.01)
   *G16Y 40/20*          (2020.01)

(56)                References Cited

U.S. PATENT DOCUMENTS

| | | | |
|---|---|---|---|
| 11,372,406 | B2 | 6/2022 | Agarwal |
| 2014/0176716 | A1 | 6/2014 | Wallat et al. |
| 2016/0061627 | A1 | 3/2016 | Tan et al. |
| 2016/0161602 | A1 | 6/2016 | Prokhorov |
| 2016/0214533 | A1 | 7/2016 | Doyle et al. |
| 2016/0245899 | A1 | 8/2016 | Rybski |
| 2016/0305794 | A1 | 10/2016 | Horita et al. |
| 2017/0123422 | A1 | 5/2017 | Kentley et al. |
| 2017/0357263 | A1 | 12/2017 | Glatfelter et al. |
| 2018/0196127 | A1* | 7/2018 | Harada .................. G01S 7/497 |
| 2018/0284243 | A1 | 10/2018 | Wood |
| 2019/0041523 | A1 | 2/2019 | Muramatsu et al. |
| 2019/0051168 | A1 | 2/2019 | Du et al. |
| 2019/0086914 | A1 | 3/2019 | Yen et al. |
| 2019/0120946 | A1 | 4/2019 | Wheeler et al. |
| 2019/0162820 | A1 | 5/2019 | Agarwal et al. |
| 2019/0196503 | A1 | 6/2019 | Abari et al. |
| 2019/0204425 | A1* | 7/2019 | Abari ...................... G01S 7/497 |
| 2019/0205670 | A1 | 7/2019 | Ganguli et al. |
| 2019/0228258 | A1 | 7/2019 | Bell et al. |
| 2020/0018618 | A1 | 1/2020 | Ozog et al. |
| 2020/0099872 | A1 | 3/2020 | Benemann et al. |
| 2020/0175311 | A1 | 6/2020 | Xu et al. |
| 2020/0215992 | A1 | 7/2020 | Plowman |
| 2020/0233432 | A1 | 7/2020 | Mielenz et al. |
| 2020/0353939 | A1 | 11/2020 | Meng et al. |
| 2020/0356788 | A1 | 11/2020 | Joseph et al. |
| 2021/0134079 | A1 | 5/2021 | Nee |
| 2021/0172761 | A1 | 6/2021 | Agarwal |
| 2021/0173393 | A1 | 6/2021 | Agarwal |
| 2021/0173394 | A1 | 6/2021 | Agarwal |
| 2021/0173412 | A1 | 6/2021 | Agarwal |
| 2021/0174685 | A1 | 6/2021 | Agarwal |
| 2022/0051439 | A1 | 2/2022 | Agarwal |

OTHER PUBLICATIONS

Extended European Search Report dated May 12, 2021 for European Application No. 202114245, 9 pages.

* cited by examiner

120

125-1

130

140

150

170

180

190

160

88.1

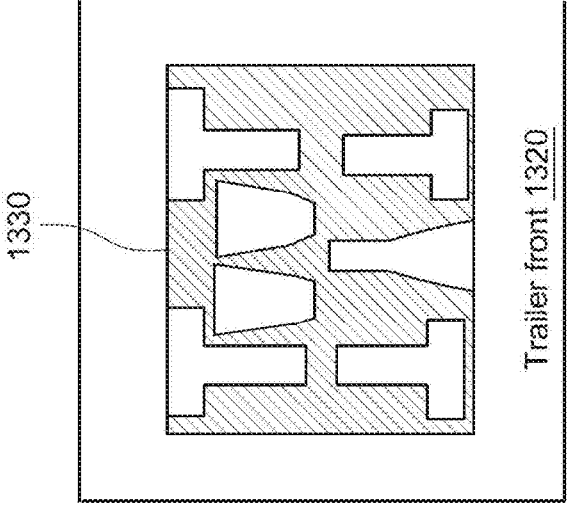
1330
Trailer front 1320
FIG. 13A
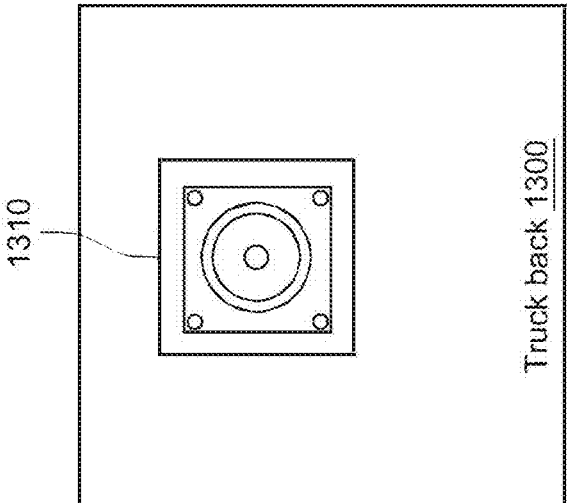
1310
Truck back 1300

Trailer front 1320

Truck back 1300

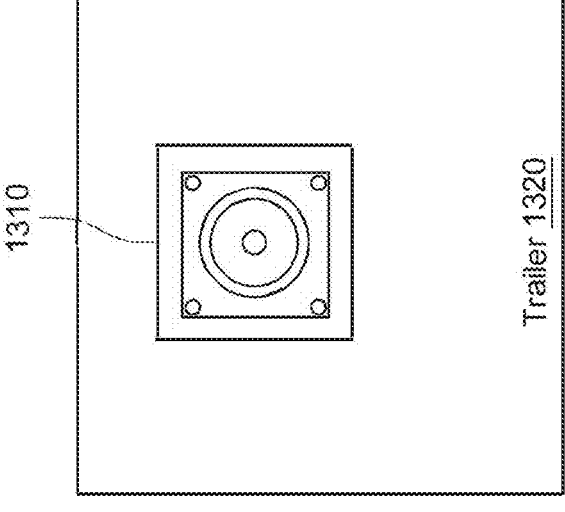
1310
Trailer 1320
FIG. 13D
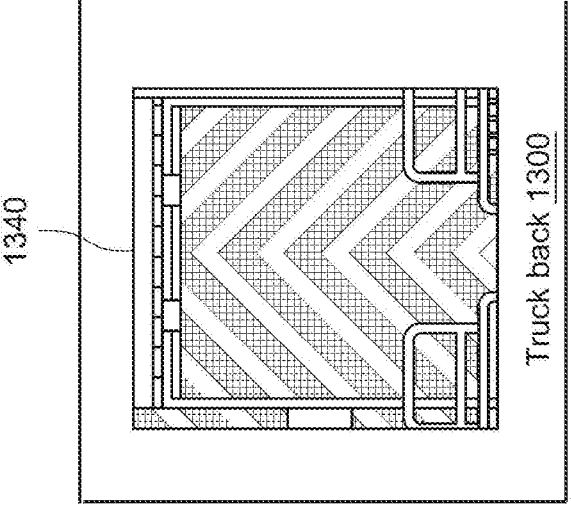
1340
Truck back 1300

1400

Trailer pose

Ref. Feature Configuration Log 1432

Trailer Pose Estimator 1450

Feature Extraction Models 1442

Calibration Parameters 1422

Transformation Generation Unit 1420

Estimation Schedule 1407

Target Image Feature Extractor 1440

Truck/Trailer Config. 1412

Intrinsic Calibration Unit 1410

Configuration Unit 1402

Target Image Acquisition Unit 1430

Operator Input

Camera Data

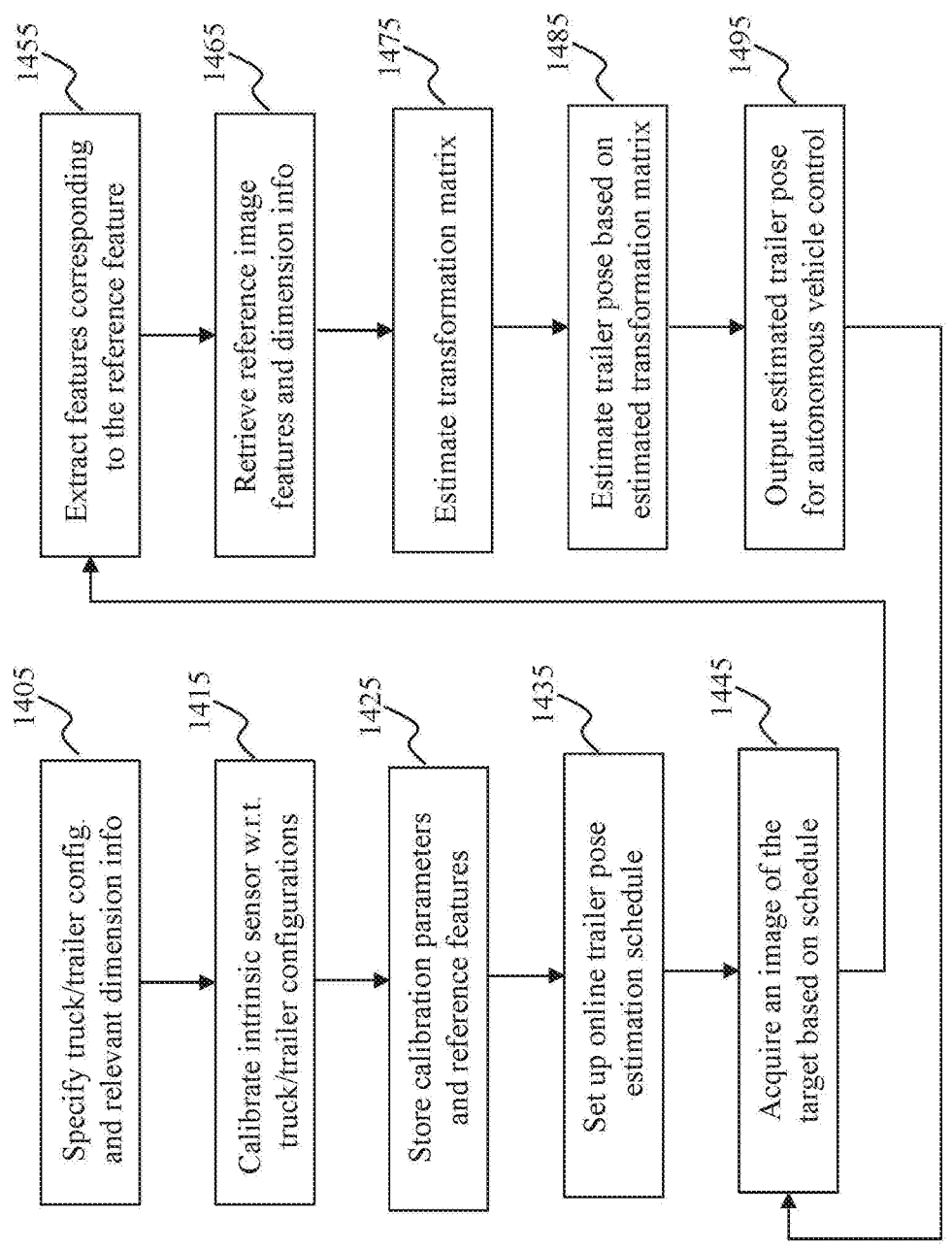

1455 Extract features corresponding to the reference feature

1465 Retrieve reference image features and dimension info

1475 Estimate transformation matrix

1485 Estimate trailer pose based on estimated transformation matrix

1495 Output estimated trailer pose for autonomous vehicle control

1405 Specify truck/trailer config. and relevant dimension info

1415 Calibrate intrinsic sensor w.r.t. truck/trailer configurations

1425 Store calibration parameters and reference features

1435 Set up online trailer pose estimation schedule

1445 Acquire an image of the target based on schedule

Fig. 14B

SYSTEM AND METHOD FOR COORDINATING COLLABORATIVE SENSOR CALIBRATION

CROSS-REFERENCE TO RELATED APPLICATIONS

This application is a continuation of U.S. patent application Ser. No. 16/707,028, filed Dec. 9, 2019 and entitled "SYSTEM AND METHOD FOR COORDINATING COLLABORATIVE SENSOR CALIBRATION", which is incorporated herein by reference.

BACKGROUND

1 Technical Field

The present teaching generally relates to autonomous driving. More specifically, the present teaching relates to autonomous driving of a fleet.

2. TECHNICAL BACKGROUND

With the advancement of sensing and artificial intelligence (AI) technologies, in recent years, autonomous driving has gradually emerged as a potential meaningful alternative to conventional manual driving. With modern sensing technologies and advance sensing information processing deployed on a moving vehicle, the moving vehicle can "see" its surrounding and obstacles that it needs to avoid by analyzing on-the-fly information received from the sensors. FIG. 1A shows one example of what is seen by an ego vehicle while moving. As seen, there are a few small hills in the far front. In the near front, there are fields and road with lane markings. On the road, there is a string of incoming moving vehicles in the opposite direction as well as some vehicles driving in the same lane in front of the ego vehicle. This is an image provided by a visual sensor, e.g., installed in the front of the ego vehicle. There may be more visual sensors installed on both sides of the ego vehicle, providing surrounding visual information as can be observed from both sides of the vehicle. There may also be other types of sensors such as LiDAR and/or radar that can be used to sense depth information, which is crucial for obstacle avoidance.

Such obtained sensor information may then be analyzed on-the-fly to make a sense of the surroundings. This is necessary to enable the ego vehicle to decide how to avoid obstacles. One example is shown in FIG. 1B. The visual information captured in front of an ego vehicle is analyzed to detect obstacles, including several other moving vehicles 100, 105, 110, and 115 present in different lanes of the front direction and road blockage 102 on the side of the road. To facilitate avoidance, relevant features associated with each of the detected obstacles may also be detected via different means. For example, for each detected moving vehicle, different measurements may be made in terms of its distance from the ego vehicle, its position with respect to the road, and its dimension. As shown in FIG. 1B, vehicle 100 is measured at 12 meters from the ego vehicle in the front lane with an estimated dimension of 4 feet by 7 feet. Such measures are presented as 12 m/FL/4X7 on the detected vehicle. Similarly, for vehicle 110, which is further away, its measures are 15 m/RL/5X8, i.e., 15 meters away from ego vehicle in the lane on the right with an estimated dimension of 5 feet by 8 feet (SUV). Vehicle 115 is closer with the measurements of 3 m/RL/4X7 (3 meter away in the lane on the right with an estimated dimension of 4 feet by 7 feet). Such semantics of the surrounding provides basis for the autonomous vehicle to determine how to safely drive without hitting any obstacle within the lane on the road.

In different transportation settings, technologies needed for autonomous driving may differ. For example, technologies developed for automated driving of, e.g., cars or SUV may not be adequate for automated driving of a truck or a truck fleet. For a truck or a fleet, there may be special challenges that require different solutions. For instance, as a truck may not break as speedily as a car or turn as swiftly as a car, it needs to "see" further in order for it to plan each action more advance in time. Often, a truck needs to be more aware of its surroundings in a bigger geographical coverage in order to be able to plan ahead. Traditional technologies in autonomous driving mostly do not address unique issues associated with trucks and truck fleets. Thus, there is a need to develop solutions to enable autonomous driving of trucks and truck fleets.

SUMMARY

The teachings disclosed herein relate to methods, systems, and programming for data processing. More particularly, the present teaching relates to methods, systems, and programming related to modeling a scene to generate scene modeling information and utilization thereof.

In one example, a method, implemented on a machine having at least one processor, storage, and a communication platform capable of connecting to a network for sensor calibration. A request is received from an ego vehicle in motion for assistance in collaborative calibration, when the ego vehicle determines that a sensor deployed thereon needs to be calibrated. The request includes at least one of a first position of the ego vehicle and a first configuration of the sensor with respect to the ego vehicle. An assisting vehicle is identified based on the first position, the first configuration, and a second position associated with the assisting vehicle and an assistance plan is generated in response to the request indicative of the assisting vehicle to travel to the ego vehicle to facilitate the calibration of the sensor by collaborating with the moving ego vehicle. Such generated assistance plan is then sent out to initiate the collaborative calibration.

In a different example, the present teaching discloses a system for sensor calibration, which includes a calibration assistant selector, an assistance route scheduling unit, and a vehicle communication unit. The calibration assistant selector is configured for receiving a request, from an ego vehicle in motion when it determines that a sensor deployed thereon needs to be calibrated, for assistance in collaborative calibration of the sensor, wherein the request includes at least one of a first position of the ego vehicle and a first configuration of the sensor with respect to the ego vehicle and identifying, from a vehicle information database, an assisting vehicle based on the first position, the first configuration, and a second position associated with the assisting vehicle. The assistance route scheduling unit configured for generating an assistance plan in response to the request indicative of the assisting vehicle to travel to the ego vehicle to facilitate the calibration of the sensor by collaborating with the moving ego vehicle. The vehicle communication unit configured for sending the assistance plan to initiate the collaborative calibration.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for sensor calibration. A request is received from an ego vehicle in motion for assistance in collaborative calibration, when the ego vehicle determines that a sensor deployed thereon needs to be calibrated. The request includes at least one of a first position of the ego vehicle and a first configuration of the sensor with respect to the ego vehicle. An assisting vehicle is identified based on the first position, the first configuration, and a second position associated with the assisting vehicle and an assistance plan is generated in response to the request indicative of the assisting vehicle to travel to the ego vehicle to facilitate the calibration of the sensor by collaborating with the moving ego vehicle. Such generated assistance plan is then sent out to initiate the collaborative calibration.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 13A-13B show different arrangements of sensor and fiducial marks with respect to truck/trailer configurations for trailer pose estimation, in accordance with an embodiment of the present teaching;

FIGS. 13C-13D show different arrangements of using sensor to see different parts in a truck/trailer configurations for trailer pose estimation, in accordance with an embodiment of the present teaching;

FIG. 14B is a flowchart of an exemplary process of a framework for estimating a pose of a trailer on-the-fly, in accordance with an embodiment of the present teaching;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1A:
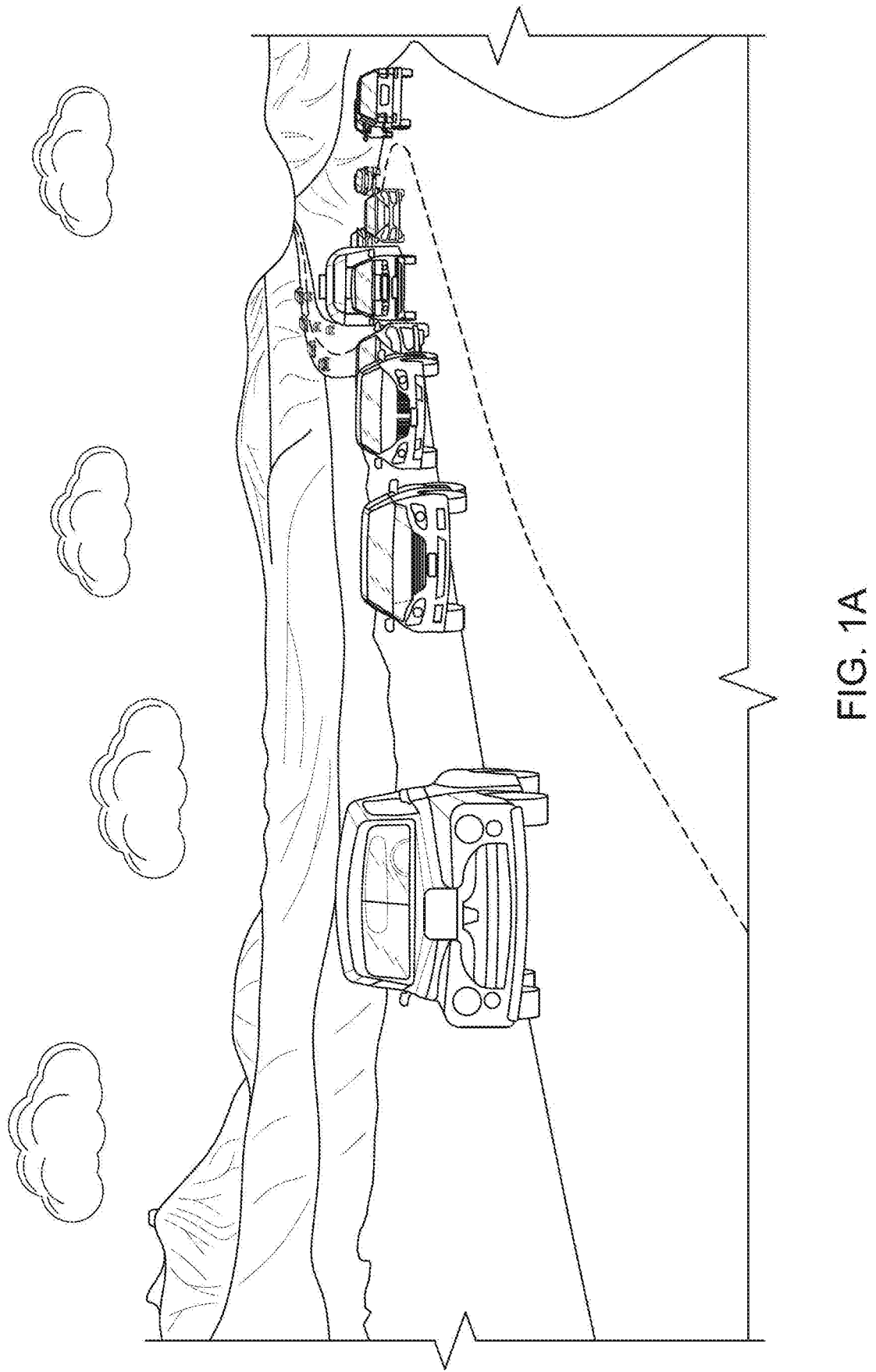
FIG. 1A illustrates a view observed by an autonomous ego vehicle from sensors deployed thereon.
Figure 1B:
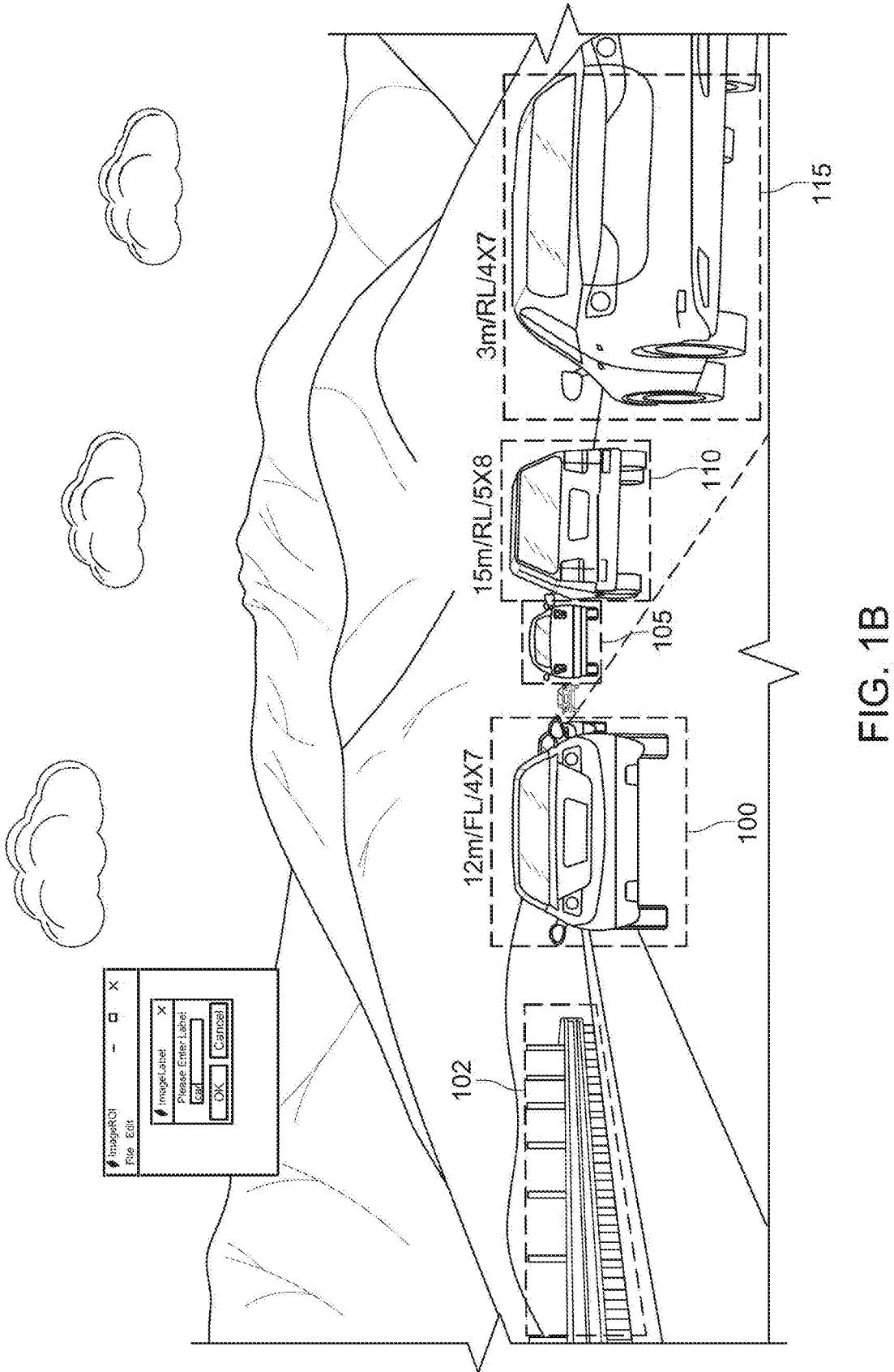
FIG. 1B illustrates information obtained by processing data from sensors deployed on an autonomous vehicle, in accordance with an embodiment of the present teaching.
Figure 1C:
FIG. 1C shows a truck with sensors deployed thereon to facilitate autonomous driving, in accordance with an embodiment of the present teaching.

The present teaching aims to address the deficiencies of the current state of the art in quality and accurate sensing in autonomous vehicles. As discussed herein, to ensure safe autonomous driving, having sensors reliably provide accurate information about the surrounding of the vehicle is essential. This is illustrated in FIG. 1B. An autonomous vehicle usually has sensors deployed thereon to provide observations of the surrounding of the vehicle. This is shown in FIG. 1C. A truck 120 has various sensors mounted thereon, including, e.g., stereo cameras 125 and 150 on the top and 170 and 190 at a lower level, a LiDAR sensor 140, a radar 180, and cameras on the sides of the vehicle such as 130 and 160. To ensure accuracy of the information, such sensors are calibrated in a way that the information truthfully reflect the scene around the vehicle. For example, calibration of stereo cameras may change when the poses of the cameras change. For instance, if a pair of stereo cameras (e.g., cameras 125 and 150) is calibrated to estimate depth of observed objects, calibrated so that the left and right images acquired by each camera may be used to perform stereo processing to estimate the depth of the objects in the scene.

Figure 1D:
FIG. 1D illustrates a scenario that requires sensors deployed on an autonomous driving truck be re-calibrated, in accordance with an embodiment of the present teaching.

When the pose of one or both of the cameras in the pair change for whatever reason, the estimated depths of objects are no longer reliable, which may cause serious miscalculation in obstacle avoidance in autonomous driving. One example is shown in FIG. 1D, where one of the stereo camera now has a changed pose to 125-1 (as opposed to 125 in FIG. 1C). Given the changed pose of camera 125-1, the right image acquired by this camera can no longer be used to correctly estimate the depth of an object seen by both 125-1 and 150 using the transformation information obtained via the previous calibration. As such, the estimated depth of an object will not reflect the actual distance between the vehicle and the obstacle, which can cause serious issues. There are different reasons for a change in the pose of a sensor. For example, it may be due to vibration of the vehicle while driving that makes the mounting means become loose or some parts of the sensor simply shifted. When that happens, the need for re-calibration arises. Although re-calibration may be carried out by stopping the vehicle, it is not realistic in most scenarios.

When changes in calibrated sensors occur while the vehicle is traveling, the accuracy of the information estimated from the sensed information will degrade, affecting the safety. Thus, re-calibration, on-the-fly, of sensors mounted on an autonomous vehicle while a vehicle is in motion is needed. This corresponds to extrinsic challenges to re-calibrate sensors on-the-fly. The present teaching discloses herein an approach for re-calibration on-the-fly via collaboration. In some embodiments, such collaboration may be between two members of a fleet traveling substantially together. In some embodiments, such collaboration may be one autonomous vehicle that needs the re-calibration and another vehicle. In some embodiments, such collaboration may be via a fixture or a landmark such as a billboard or a structure with known dimensions and/or planar image which is visible by an autonomous vehicle.

Figure 2A:
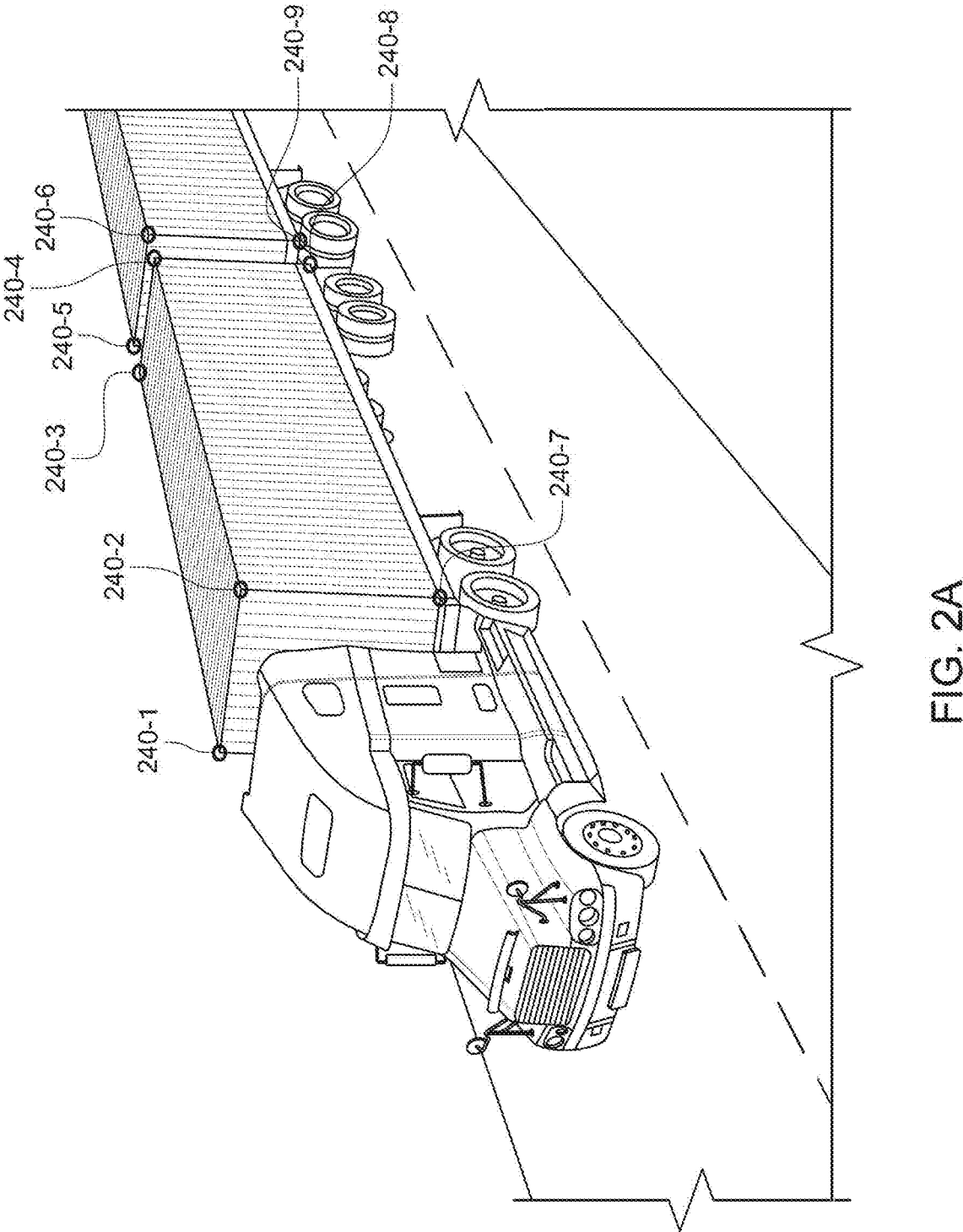
FIG. 2A shows a truck with trailers having associated critical points to be estimated to facilitate the truck to perform autonomous driving, in accordance with an embodiment of the present teaching.
Figure 2B:
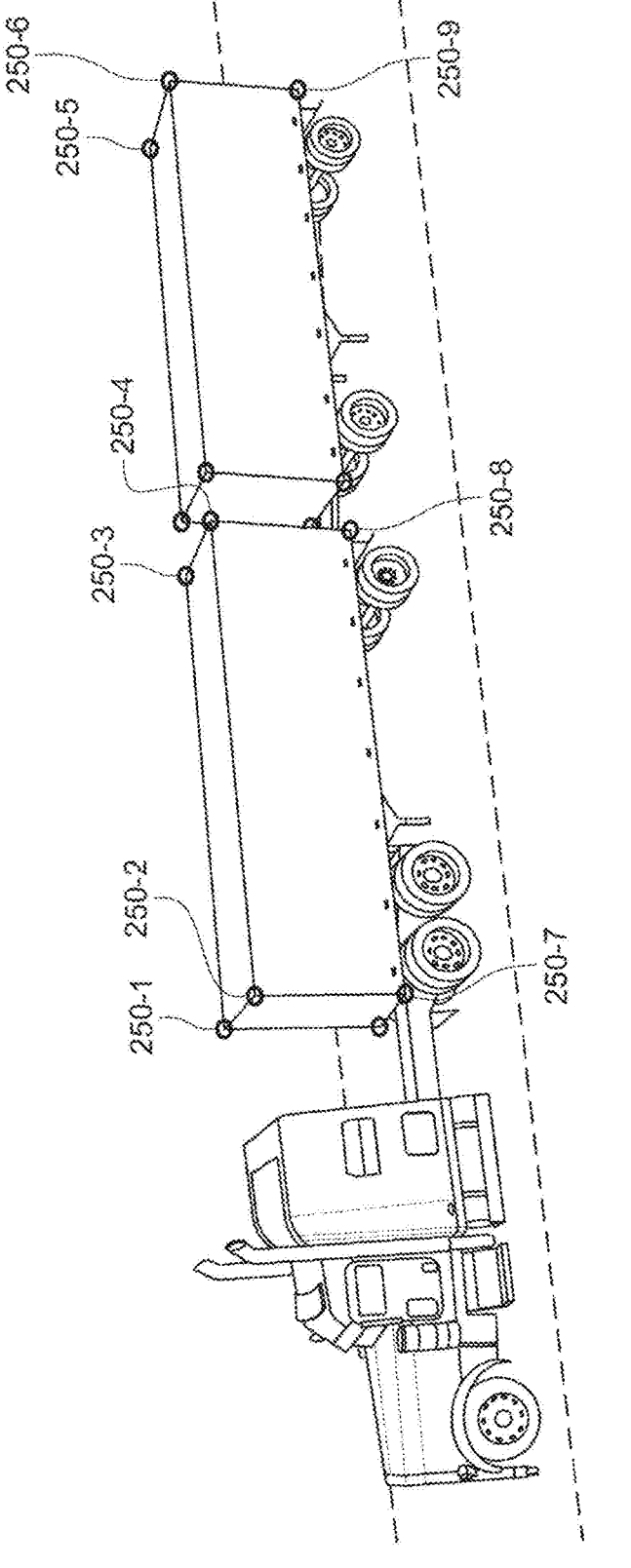
FIG. 2B shows a different scenario of a truck with trailers having associated critical points to be estimated to facilitate the truck to perform autonomous driving, in accordance with an embodiment of the present teaching.

In the context of trucks with trailers connected thereto, as shown in FIG. 2A, additional challenges exist in terms of autonomous driving. For instance, a crucial safety challenge is to make sure that the entire structure (truck and trailer) is within a driving lane. As seen in FIG. 2A, besides the truck in a desired lane, the trailers (in this example, there are two trailers) need to be in the same lane as well. In FIG. 2A, there are corner points of the trailers, including 240-1-240-9 in the visible area, to ensure that the trailers are within the same lane as the truck, there corner points need to be within the lane. When the truck is changing lanes, the control challenge is how to control the vehicle to make sure that all corner points from the connected trailers will be moving into a new lane safely. This is illustrated in FIG. 2B. Corner points on two trailers include 250-1, 250-2, . . . , 250-9. Some of them may be already in the same lane as the truck but some are still outside of the range of the lane the truck is in. To determine how to control the truck so that all corner points can be safely and quickly move into the same lane requires the vehicle (or truck) be aware of where all the corner points are in relation to the lane at different times. This corresponds to intrinsic challenges to constantly be aware the dispositions of different parts of a truck-trailer configuration in order to ensure proper control of an autonomous driving truck.

Figure 3A:
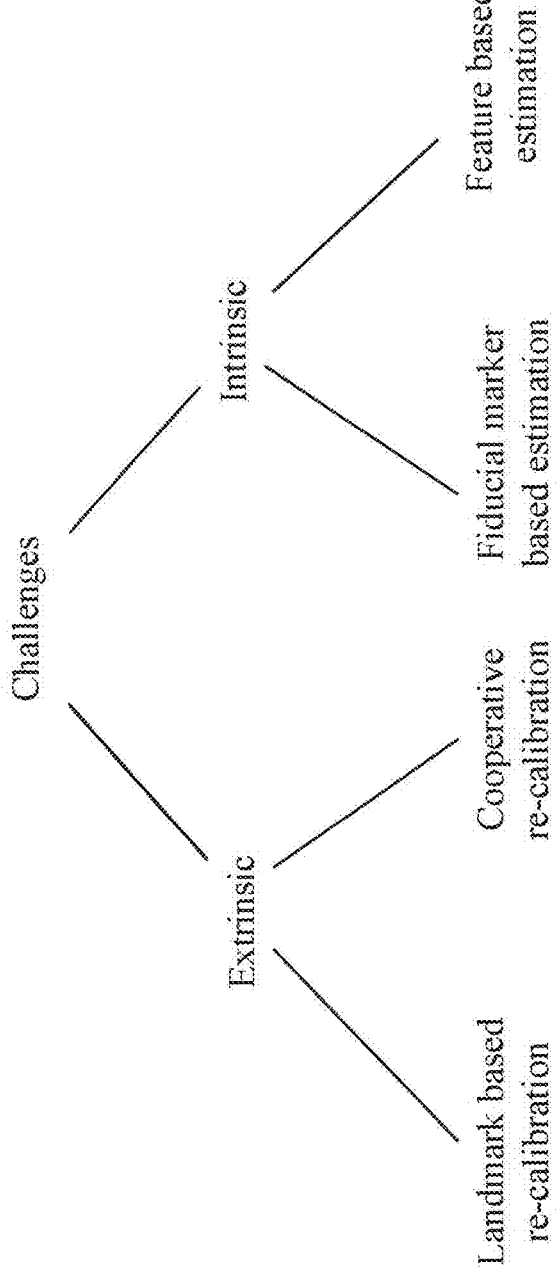
FIG. 3A describes different types of challenges in autonomous driving, in accordance with an embodiment of the present teaching.

FIG. 3A describes different challenges in autonomous driving, including extrinsic ones for sensor re-calibration dynamically on-the-fly and intrinsic ones for means to monitor the dynamic physical dispositions of truck/trailer configurations to devise appropriate vehicle control strategy in autonomous driving. In the present teaching, to address the extrinsic challenge of re-calibration on-the-fly, cooperative re-calibration and landmark based re-calibration are described with respect to FIGS. 3B-11B. To address the intrinsic challenge of estimating the dispositions of different parts of a truck/trailer configuration, fiducial marker based estimation and feature based estimation approaches are disclosed with respect to FIGS. 12A-15B.

Figure 3B:
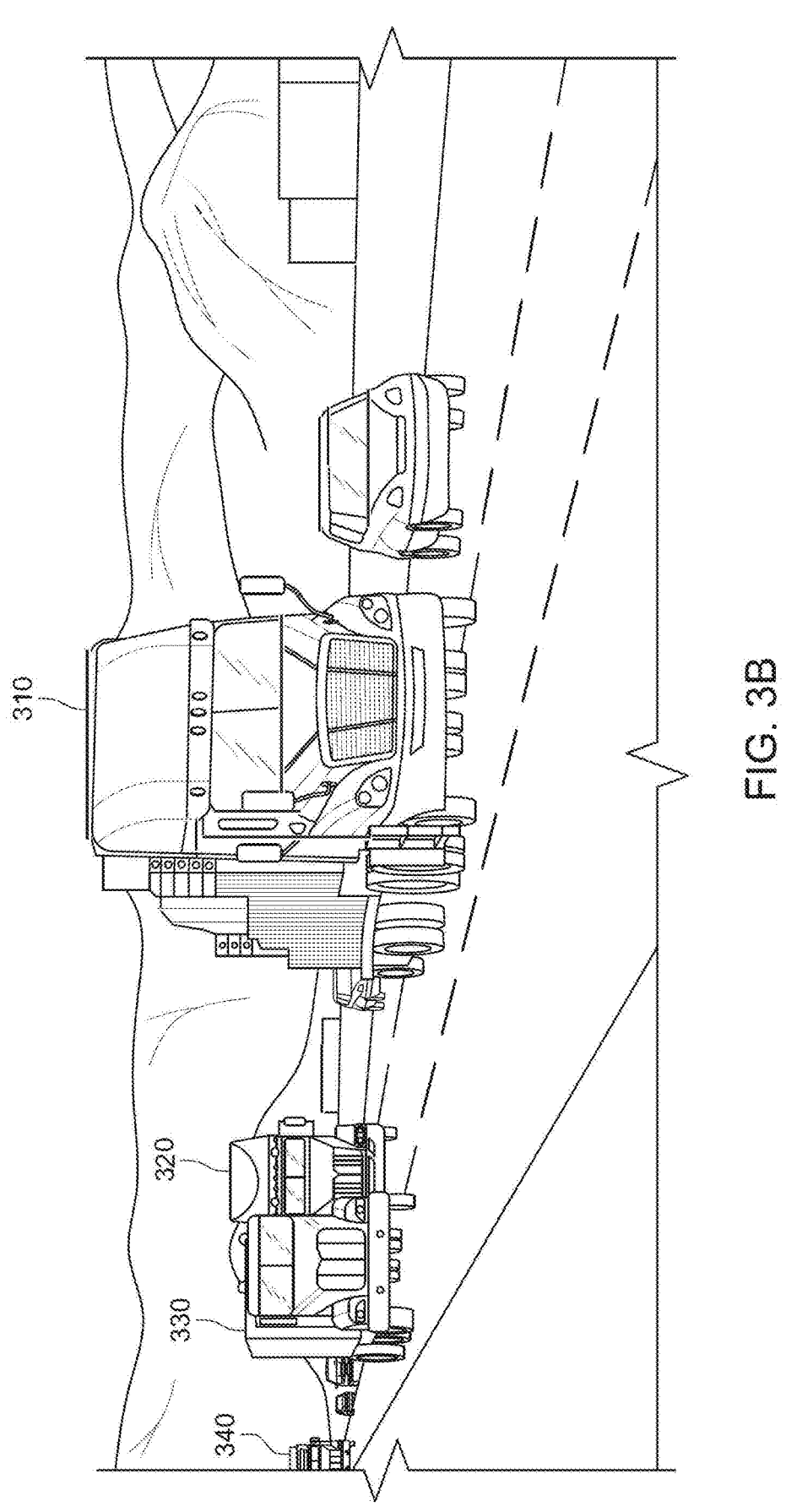
FIG. 3B shows an exemplary scene of a truck fleet on the road.
Figure 4A:
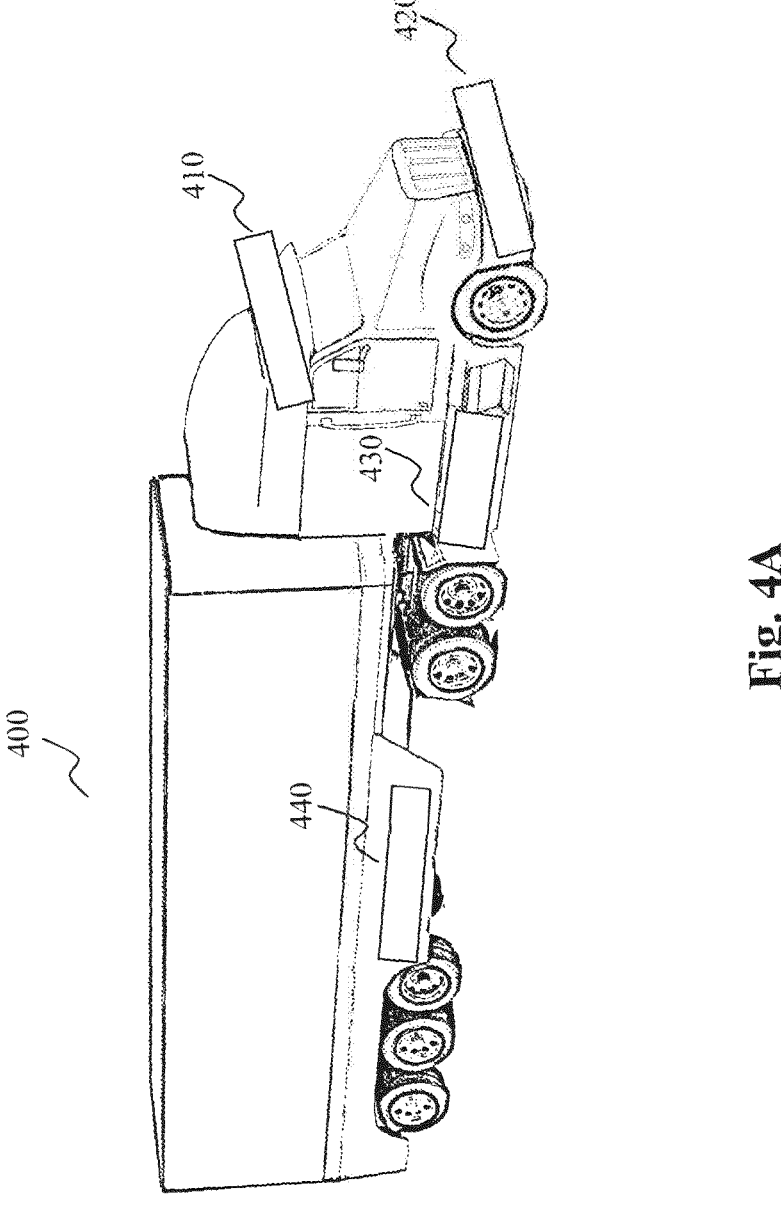
FIGS. 4A-4B show exemplary deployment of sensors around different parts of a truck/trailer configuration to facilitate autonomous driving, in accordance with an embodiment of the present teaching.
Figure 4B:
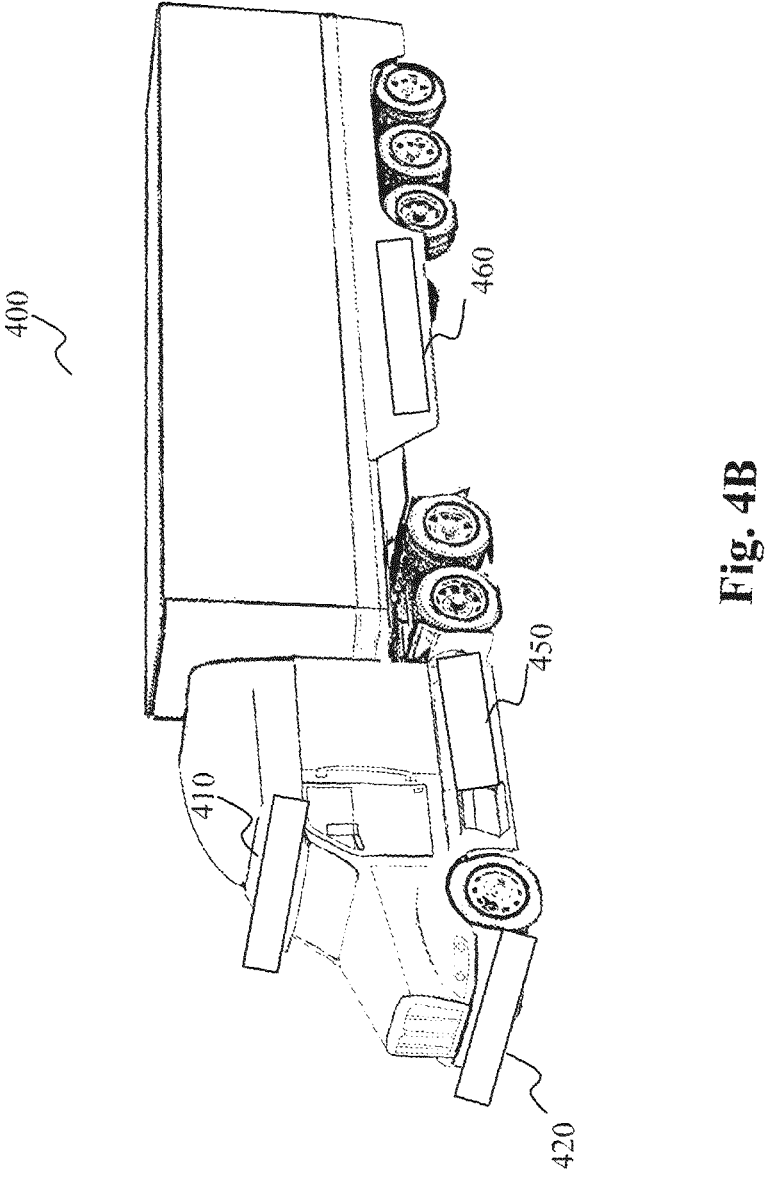

Trucks are normally used for transporting goods. To maximize the efficiency, each truck may be loaded with one or more trailers. In addition, trucks often travel as a fleet as shown in FIG. 3B, where trucks 310, 320, 330, and 340 (maybe more) travel as a fleet. Such characteristics may be utilized to facilitate collaborative calibration. Each of the fleet members may have sensors deployed all around it. FIGS. 4A-4B show exemplary deployment of sensors around different parts of a truck/trailer configuration to facilitate autonomous driving, in accordance with an embodiment of the present teaching. As shown in FIGS. 4A and 4B. Sensors or sensor racks, each of which may have more than one sensors mounted thereon, may be strategically affixed on different parts of each fleet member. For instance, as illustrated in FIG. 4A, truck/trailer 400 may have a sensor rack 410 installed on top of the truck, 420 on front of the truck, 430 on side of the truck, and 440 on side of the trailer. In FIG. 4B, the truck/trailer 400 has a sensor rack 450 installed on the other side of the truck and 460 on the other side of the trailer.

Figure 5A:
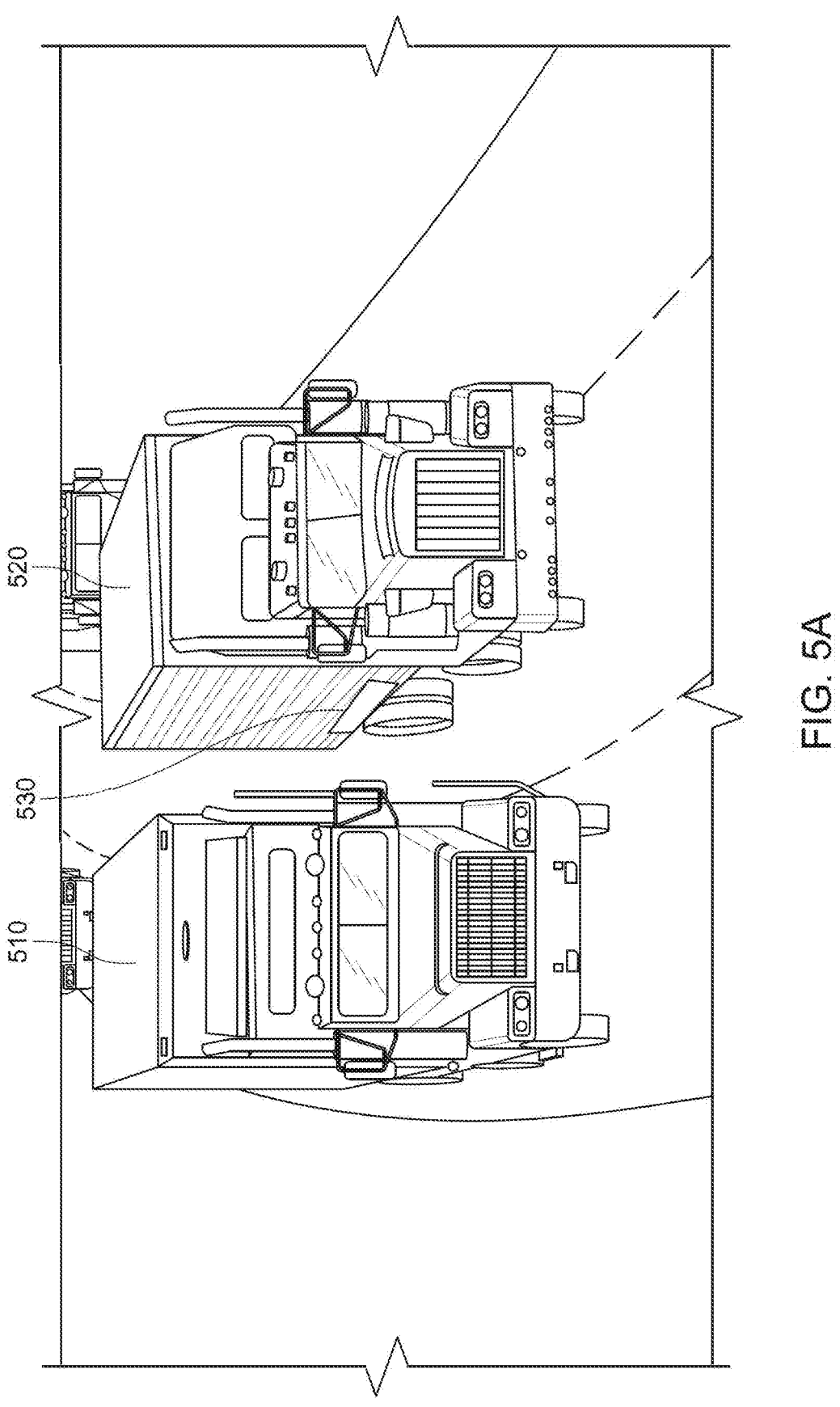
FIG. 5A shows two trucks in a fleet driving in parallel on the road to enable re-calibration of sensors on-the-fly to facilitate autonomous driving, in accordance with an embodiment of the present teaching.
Figure 5B:
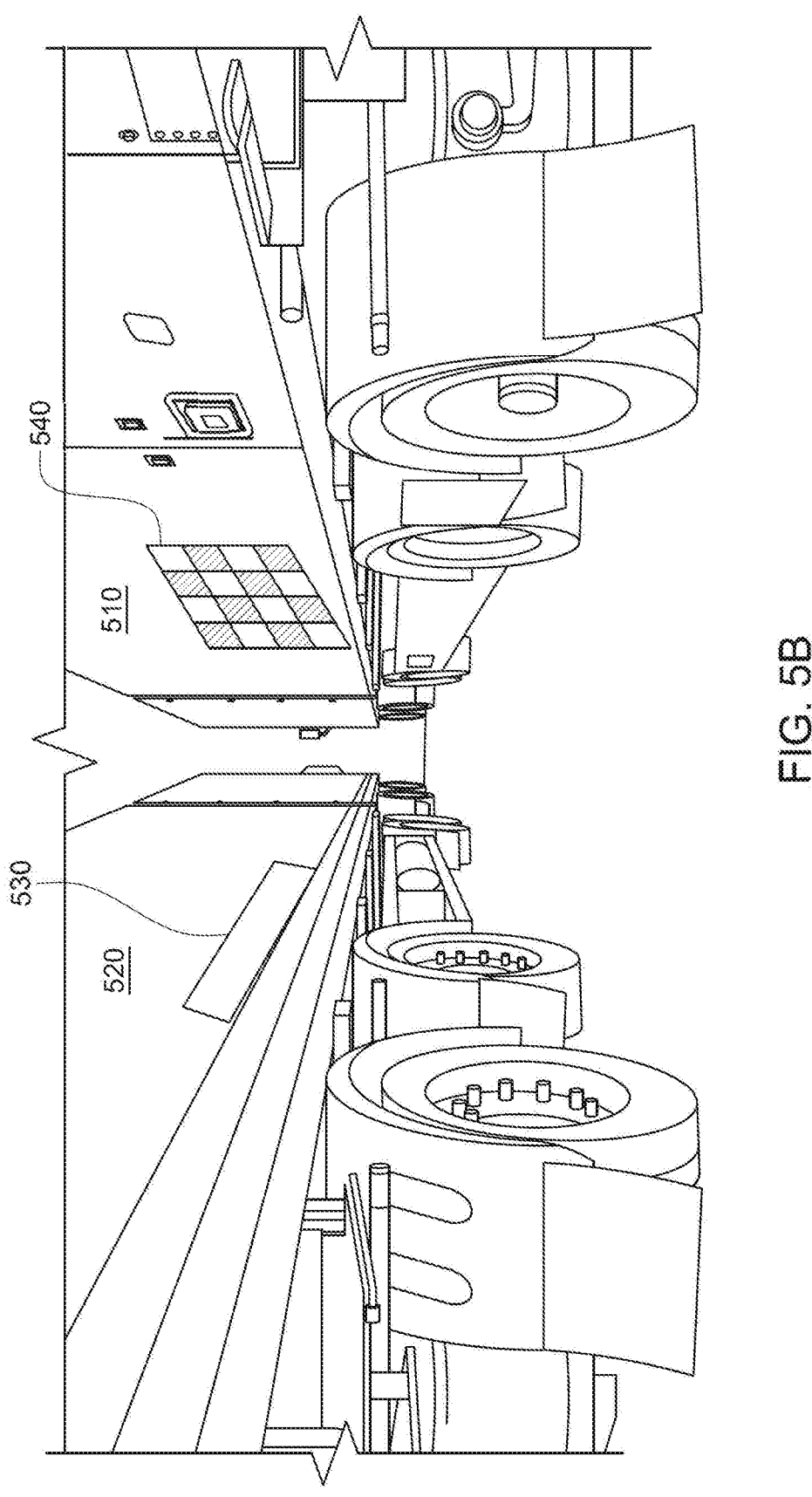
FIGS. 5B-5C show truck/trailer having special sign thereon being used to assist another to calibrate a sensor on-the-fly while both are traveling, in accordance with an embodiment of the present teaching.
Figure 5C:
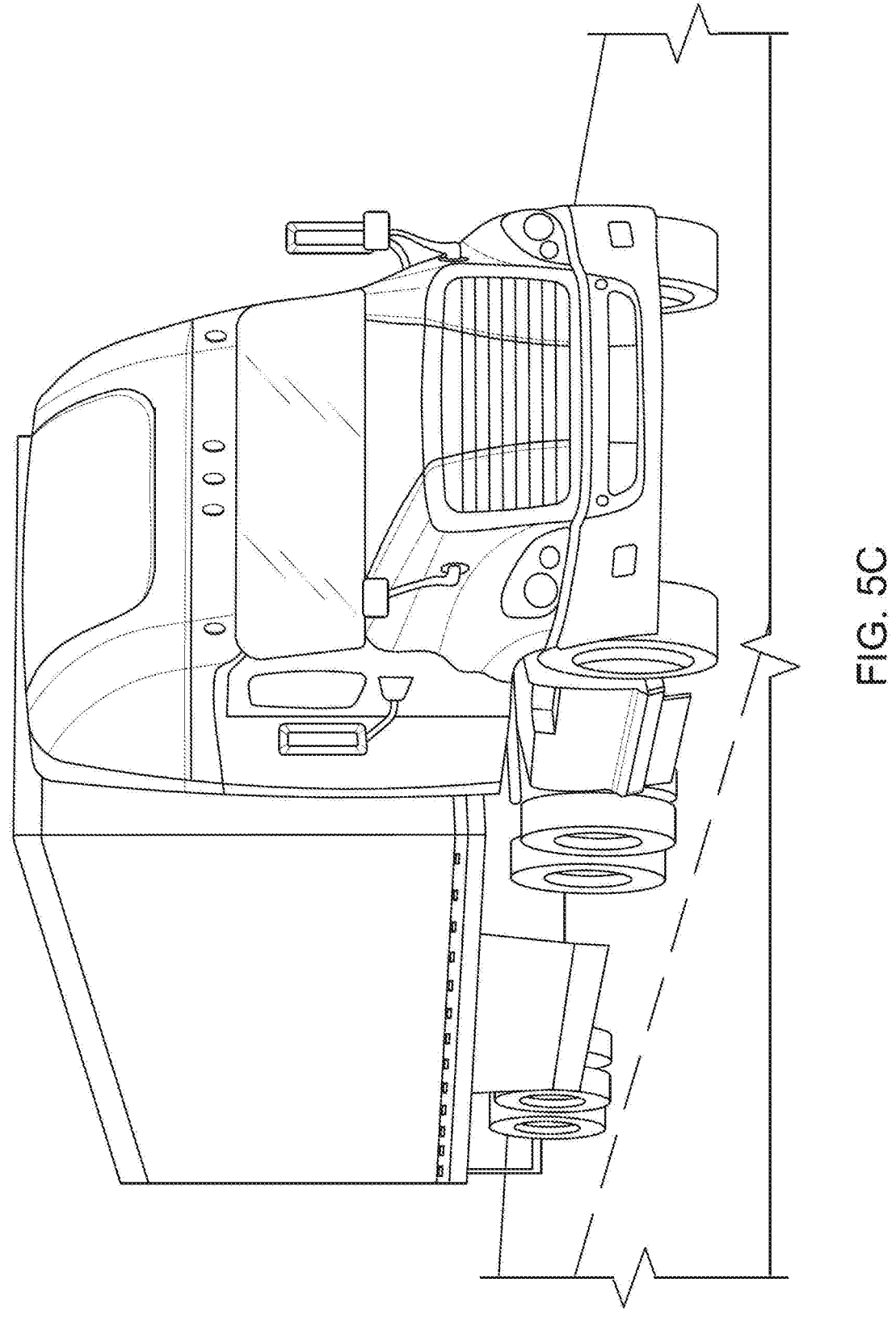

When multiple fleet members traveling in the same vicinity, if a fleet member (ego vehicle) needs to re-calibrate a sensor mounted at a known position, another fleet member may be called upon to collaborate, on-the-fly, with the ego vehicle to calibrate the sensor while both vehicles are moving, when the collaborating fleet member is provided with certain target (sign) to facilitate that. FIG. 5A shows two trucks 510 and 520 in a fleet driving in parallel on the road to collaborate for sensor calibration on-the-fly in autonomous driving, in accordance with an embodiment of the present teaching. In this configuration, one fleet member, e.g., 520, may be in a need to calibrate a sensor in a sensor rack 530 deployed on one side of the truck 520. FIG. 5B shows truck having a target sign as a checkboard 540 on one side of truck 510 can be used to assist truck 520 to calibrate a sensor in 530 on-the-fly while both are driving in parallel on the road, in accordance with an embodiment of the present teaching. As the checkboard has a known structure and features, it can be used to calibrate a camera that can "see" it. Depending on which side of a truck the sensor needing calibration is located, the assisting truck may be instructed to maneuver to an appropriate side to allow the sensor needing calibration to "see" the special sign designed to facilitate calibration. In some embodiments, the target may be some pattern on the body of a truck or a trailer with some known visual characteristics. FIG. 5C shows an example of a truck with its side printed on its body of a sign "Walmart" with a logo next to it. Such a target sign may also be used to facilitate collaborative calibration.

Figure 6A:
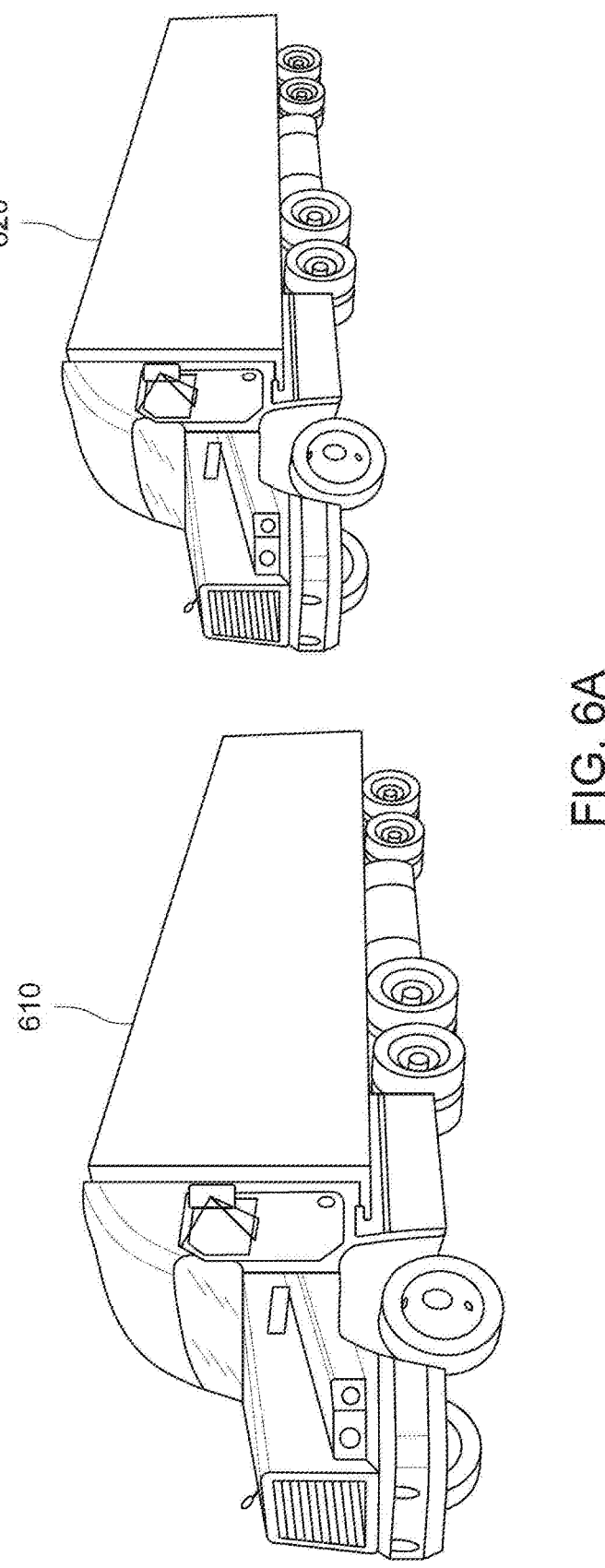
FIGS. 6A-6D show how two fleet members traveling in a front/back configuration may coordinate to facilitate sensor re-calibration on-the-fly, in accordance with an embodiment of the present teaching.
Figure 6B:
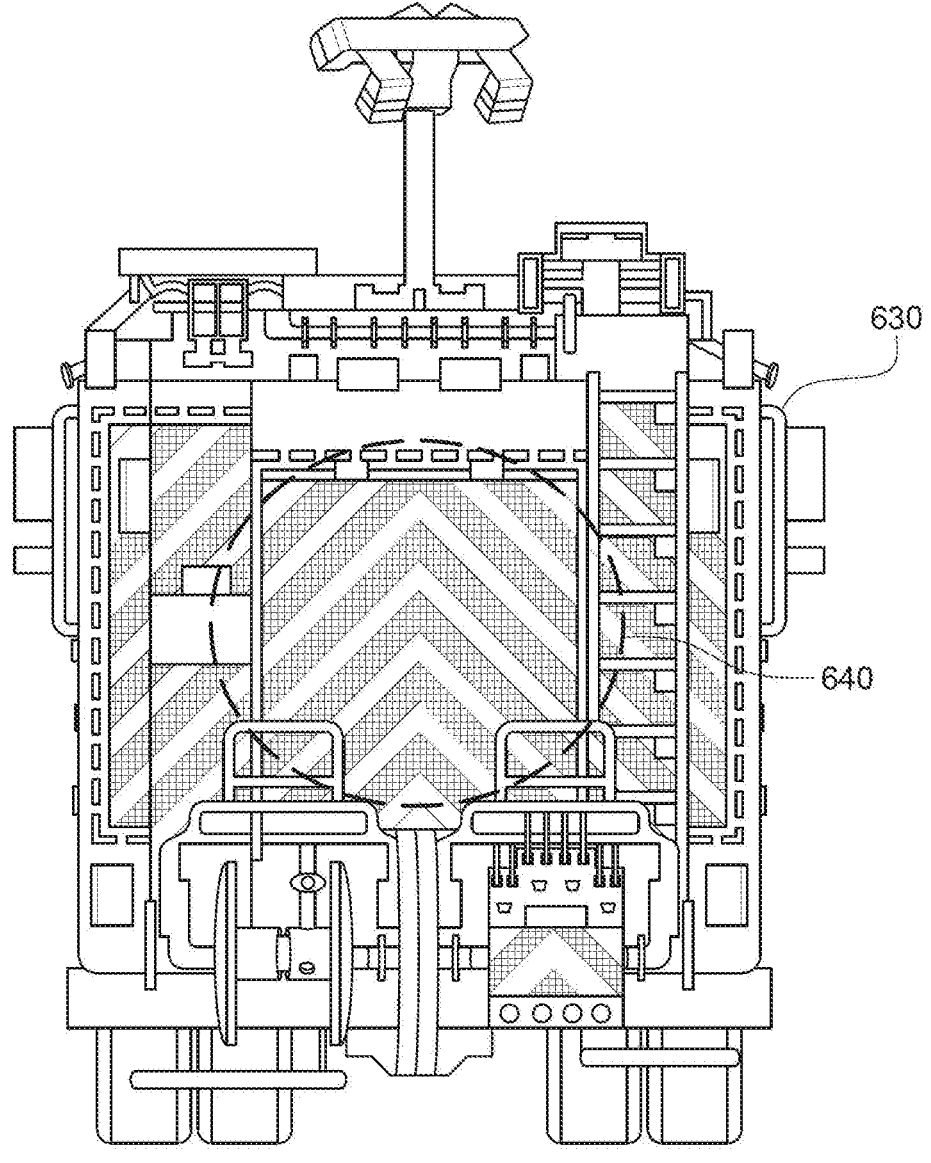
Figures 6C, 6D:
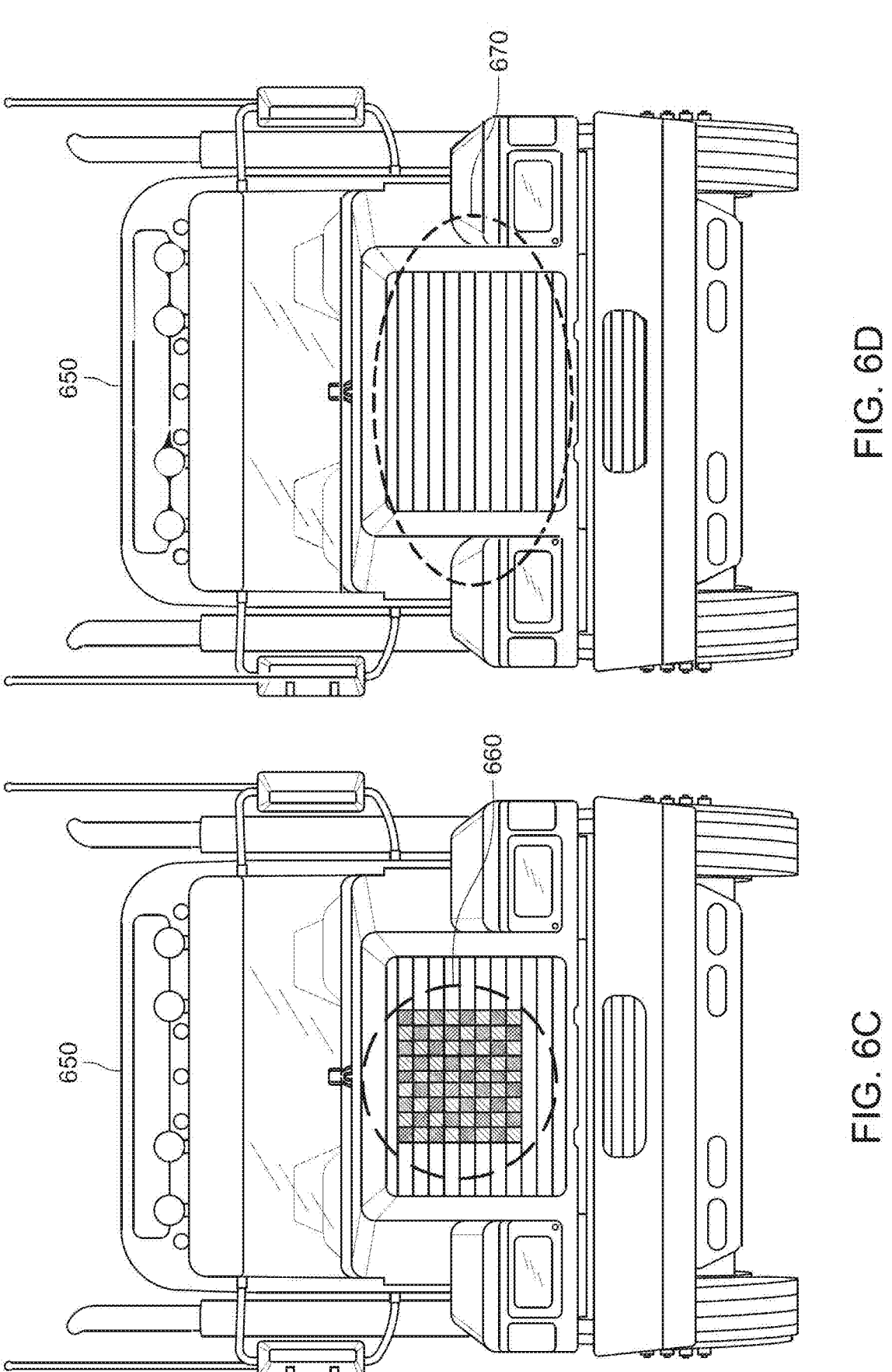

FIGS. 6A-6C show how two fleet members traveling in a front/back configuration may collaborate to facilitate sensor re-calibration on-the-fly, in accordance with an embodiment of the present teaching. In FIG. 6A, there are two trucks 610 and 620 traveling in the same lane, one in front (610) and one in the back (620). If a camera installed in the front of truck 620 needs to be calibrated, a target on the back surface of truck 610 with certain known visual features may be observed by the camera on 620 and used to calibrate. Vice versa can be done as well. If a camera in the back of truck 610 needs to be calibrated, a target on the front of truck 620 with certain known visual features may be captured by the camera on 610 and used to carry out the needed calibration.

As discussed herein, a target with known visual features may be a part of the vehicle/trailer (as shown in FIG. 5C) or may be an exterior target placed on the body of the vehicle/trailer. FIG. 6B illustrates an exemplary target 640 for collaborative calibration in the back of a truck 630 that can be used to assist on-the-fly calibration. The target in FIG. 6B is a part of the truck with known visual characteristics of contrasting stripes and feature points corresponding to the intersections of such stripes. FIG. 6C illustrates an exterior target 660 affixed in the front side of a truck 650 that can be used to calibrate a camera located in the back of another vehicle. In some embodiments, other native features of truck 650 may also be used as target for collaborative calibration. For instance, as shown in FIG. 6D, the grid 670 and its surrounding may be used as a native target for collaborative calibration. Any native part on exterior part of a truck may be used as a target so long as there are some known and distinct visual features.

As discussed herein, members of the same fleet may collaborate with each other to perform sensor calibration while the fleet is in motion. In some embodiments, collaborative calibration may also be carried out between an ego vehicle and another non-fleet vehicle that is called to assist the ego vehicle to carry out the calibration. Such arrangement may be made by either inter-communications between vehicles or via some kind of central control. In the former case, among different vehicles, there may be cross communication platform on which an ego vehicle needing assistance in carrying out calibration on-the-fly may pose a request with some details (e.g., its geo location, type of sensor to be calibrated, and position of the sensor on the ego vehicle) and any other vehicles connected to the same platform may respond. In the latter case, an ego vehicle that is in need of calibrating a sensor may make a request to the center to designate an assisting vehicle for collaborative calibration. Similarly, the request may include the geo location of the ego vehicle and some details regarding the sensor to be calibrated (e.g., type of sensor, location of the sensor on the ego vehicle, etc.). The center then identifies the assisting vehicle, whether it is a member of the same fleet as the ego vehicle or a non-fleet member vehicle and allocate it to assist the ego vehicle in collaborative calibration.

Figure 7A:
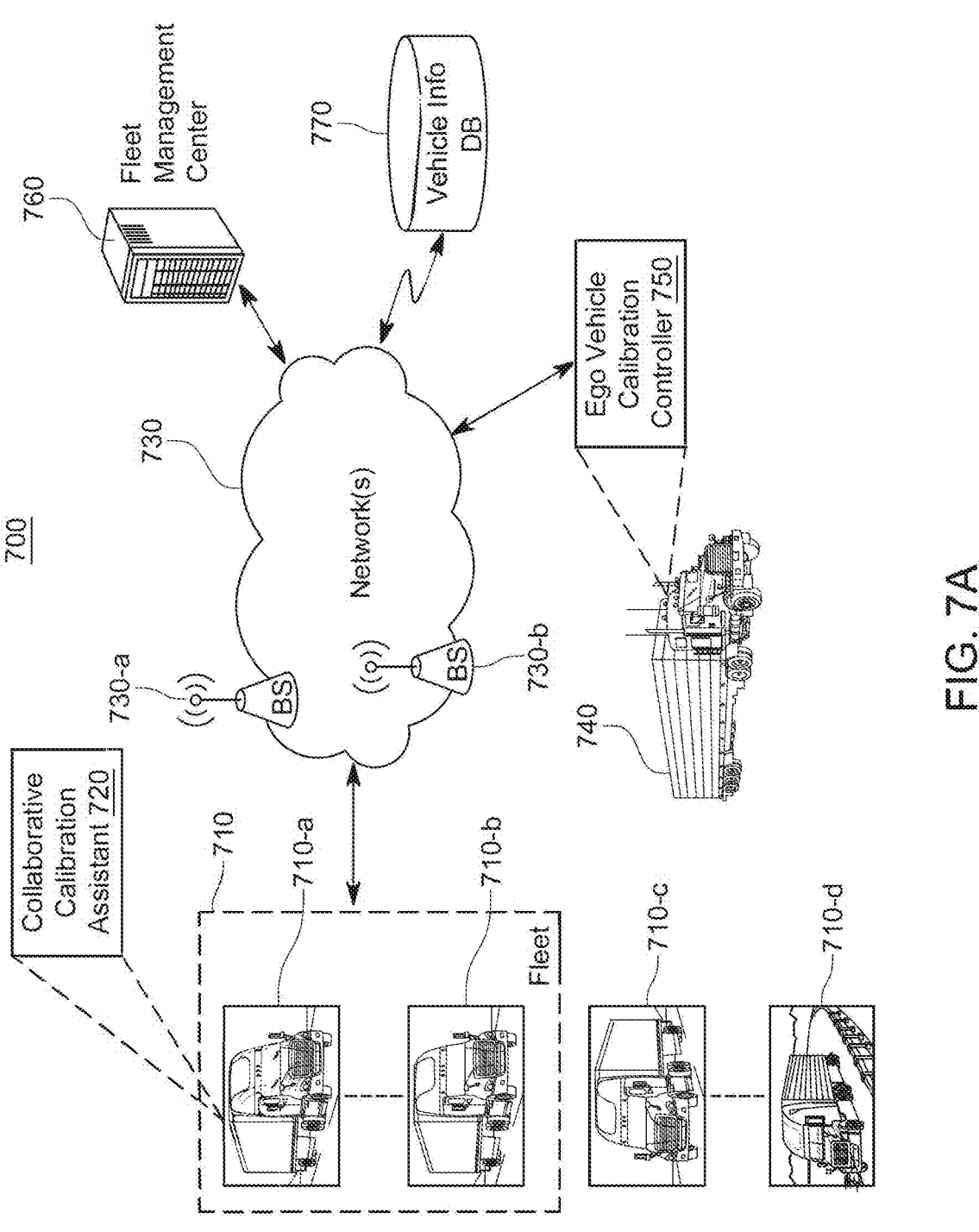
FIGS. 7A-7B depicts an exemplary framework of collaborative sensor calibration on-the-fly, in accordance with an embodiment of the present teaching.
Figure 7B:
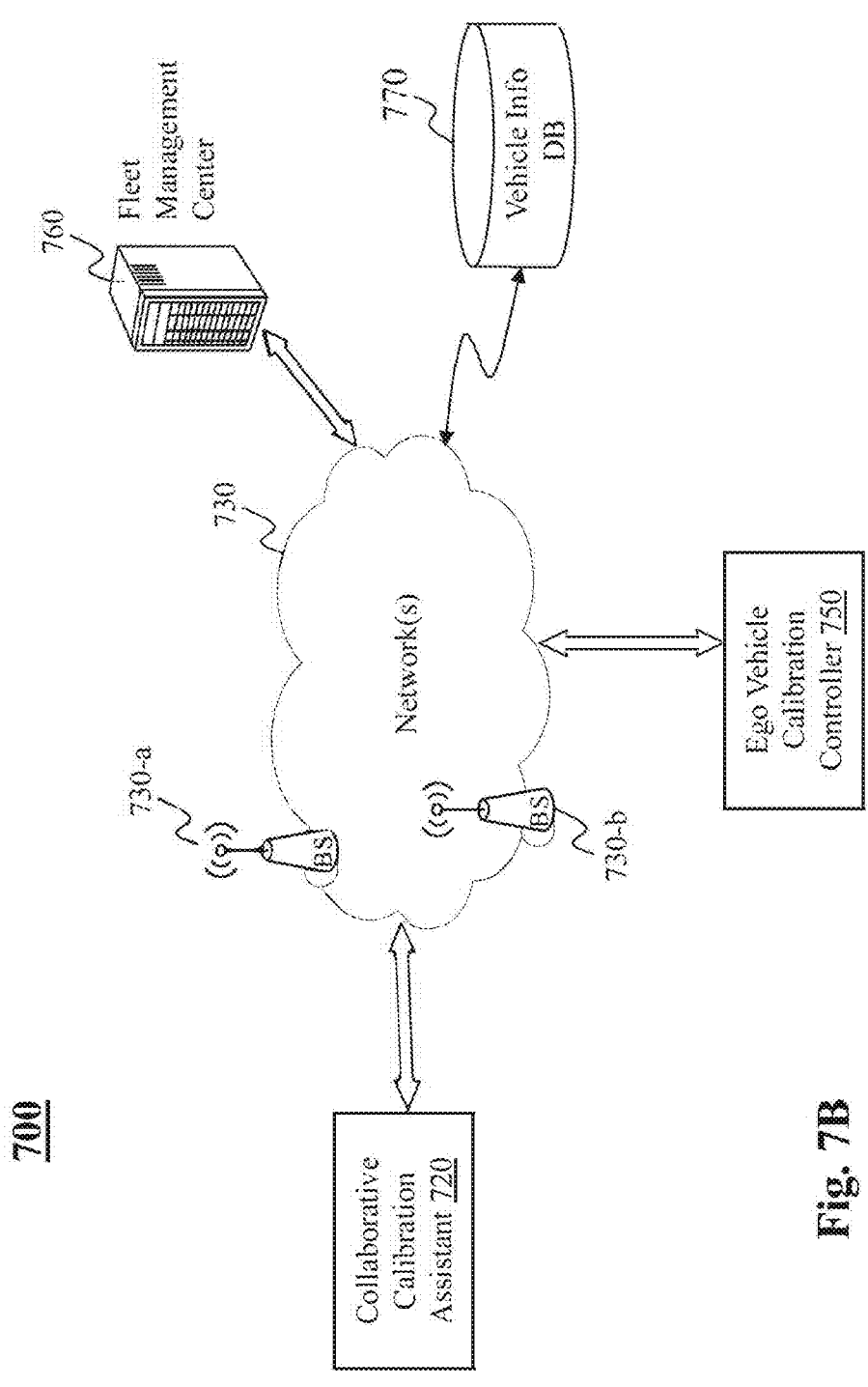

FIGS. 7A-7B depicts an exemplary framework 700 for collaborative sensor calibration on-the-fly, in accordance with an embodiment of the present teaching. In this framework, it includes various vehicles on the roads 710, such as vehicles 710-a, . . . , 710-b traveling together as a fleet, and individual traveling vehicles 710-c, . . . , 710-d. The framework 700 also include an ego vehicle 740 that is in need for calibrating at least one sensor mounted thereon. Such vehicles, including the ego vehicle and others, may be connected to a fleet management center 760 via network 730. The ego vehicle may be any of the vehicles traveling on the road. There may also be multiple vehicles that need assistance to perform collaborative calibration. Using one ego vehicle as a vehicle in need of calibration here is merely for illustration and it is not a limitation of the present teaching.

In some embodiments, vehicles in the framework or vehicles traveling in a close vicinity of the framework may communicate with each other in a peer network setting (not shown). In this scenario, when the ego vehicle 740 requests assistance from another in the close vicinity for collaborative calibration, other vehicles in the vicinity may respond to the request and then communicate with the ego vehicle directly to coordinate the necessary maneuver to achieve calibration on-the-fly.

In some embodiments, the coordination or at least a part thereof is performed by the fleet management center 760, which manages both vehicles traveling as a fleet and individual vehicles on various roads. The ego vehicle is equipped with an ego vehicle calibration controller 750. When a need for calibrating a sensor is detected, the ego vehicle calibration controller 750 sends a request to the fleet management center 760 with relevant information about, e.g., its geo location, sensor(s) needing calibration and their positions on the ego vehicle, urgency, etc. Upon receiving the request, the fleet management center 760 may then search for an appropriate candidate based on vehicle information stored in a database 770 on the current locations of vehicles, planned routes, task completion time, configuration (whether each vehicle is configured to perform collaborative calibration, etc. An assisting vehicle may be selected based on an acceptance of the selected assisting vehicle. In this illustrated embodiment in FIG. 7A, the exemplary selected assisting vehicle is 710-*a*, which includes a collaborative calibration assistant 720. As discussed herein, the selected assisting vehicle may be from the same fleet as the ego vehicle or a non-fleet member independently traveling close by.

In some embodiments, when the ego vehicle 740 and the selected assisting vehicle are connected (via the fleet management center 760), they may either communicate directly with each other to coordinate the maneuver via network 730 or still via the fleet management center 760. In some situations, allocating a non-fleet member as the assisting vehicle to travel to the ego vehicle to perform collaborative calibration may require the assisting vehicle to take a detour from its originally planned route. Such dynamic information may be recorded in the vehicle info database 770 so that the locations of all vehicles managed by the fleet management center 760 are up to date and accurate.

FIG. 7B is s simplified view of FIG. 7A, where there are three primary parties, i.e., the ego vehicle calibration controller 750 of an ego vehicle, the fleet management center 760, and the collaborative calibration assistant 720 of a selected assisting vehicle, communicating via network 730 in framework 700 for coordinating collaborative calibration among different vehicles. Although illustrations are provided with respect to trucks, other types of vehicles may also use various aspects of the present teaching as disclosed herein for collaborative calibration on-the-fly when vehicles are in motion. The fleet management center 760 may be a centralized location or may be distributed in different geographical locations to form a cloud. Each of such distributed fleet management centers in the cloud may be configured to be responsible for the management of vehicles traveling in a designated geo fenced region. When a request comes from an ego vehicle traveling close to the boundary of a geo fenced region, fleet management centers responsible for the neighboring regions of the boundary may communicate to select an appropriate assisting vehicle, which may be from outside of the geo region where the request is initiated.

In some embodiments, network 730 may correspond to a single network or a combination of different networks. For example, network 730 may be a local area network ("LAN"), a wide area network ("WAN"), a public network, a proprietary network, a proprietary network, a Public Telephone Switched Network ("PSTN"), the Internet, an intranet, a Bluetooth network, a wireless network, a virtual network, and/or any combination thereof. In one embodiment, network 730 may also include various network access points. For example, framework 700 may include wired or wireless access points such as, without limitation, base stations or Internet exchange points 730-*a*, . . . , 730-*b*. Base stations 730-*a* and 730-*b* may facilitate, for example, communications to/from ego vehicle 740, the fleet management center 760, and/or other vehicles 710 with one or more other components in the networked framework 700 across different types of network.

Figure 7C:
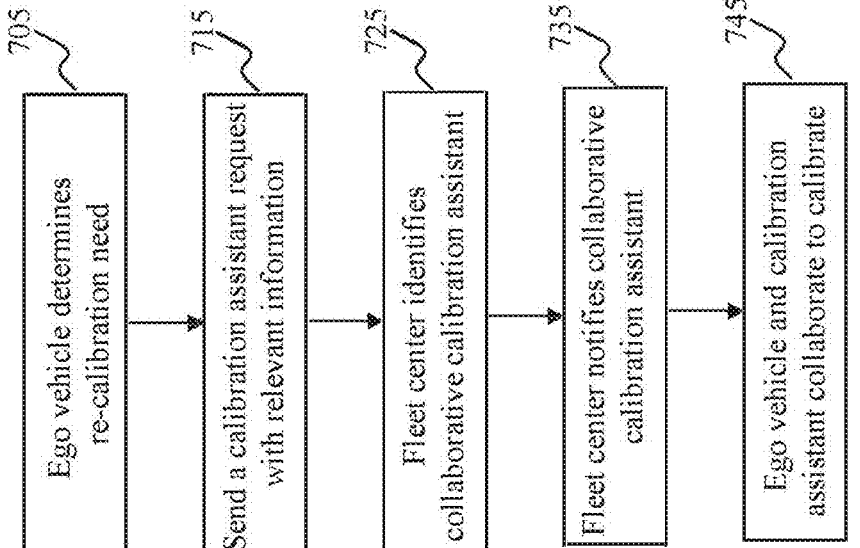
FIG. 7C is a flowchart of an exemplary process for collaborative sensor calibration on-the-fly, in accordance with an embodiment of the present teaching.

FIG. 7C is a flowchart of an exemplary process for collaborative sensor calibration on-the-fly, in accordance with an embodiment of the present teaching. An ego vehicle determines, at 705 during its travel, whether there is a need to re-calibrate a sensor. If there is a need, the ego vehicle sends, at 715, a request to the fleet management center 760 for a calibration assistant to help to collaborative calibration with relevant information (e.g., its geo location, information about the sensor to be re-calibrated, etc.). When the fleet management center 760 receives the request, it identifies, at 725, an appropriate assisting vehicle to collaborate with the ego vehicle to achieve calibration on-the-fly and notifies, at

735, the selected assisting vehicle. Once the ego vehicle and the assisting vehicle is connected, they collaborate, at 745, to coordinate the calibration.

Figure 8A:
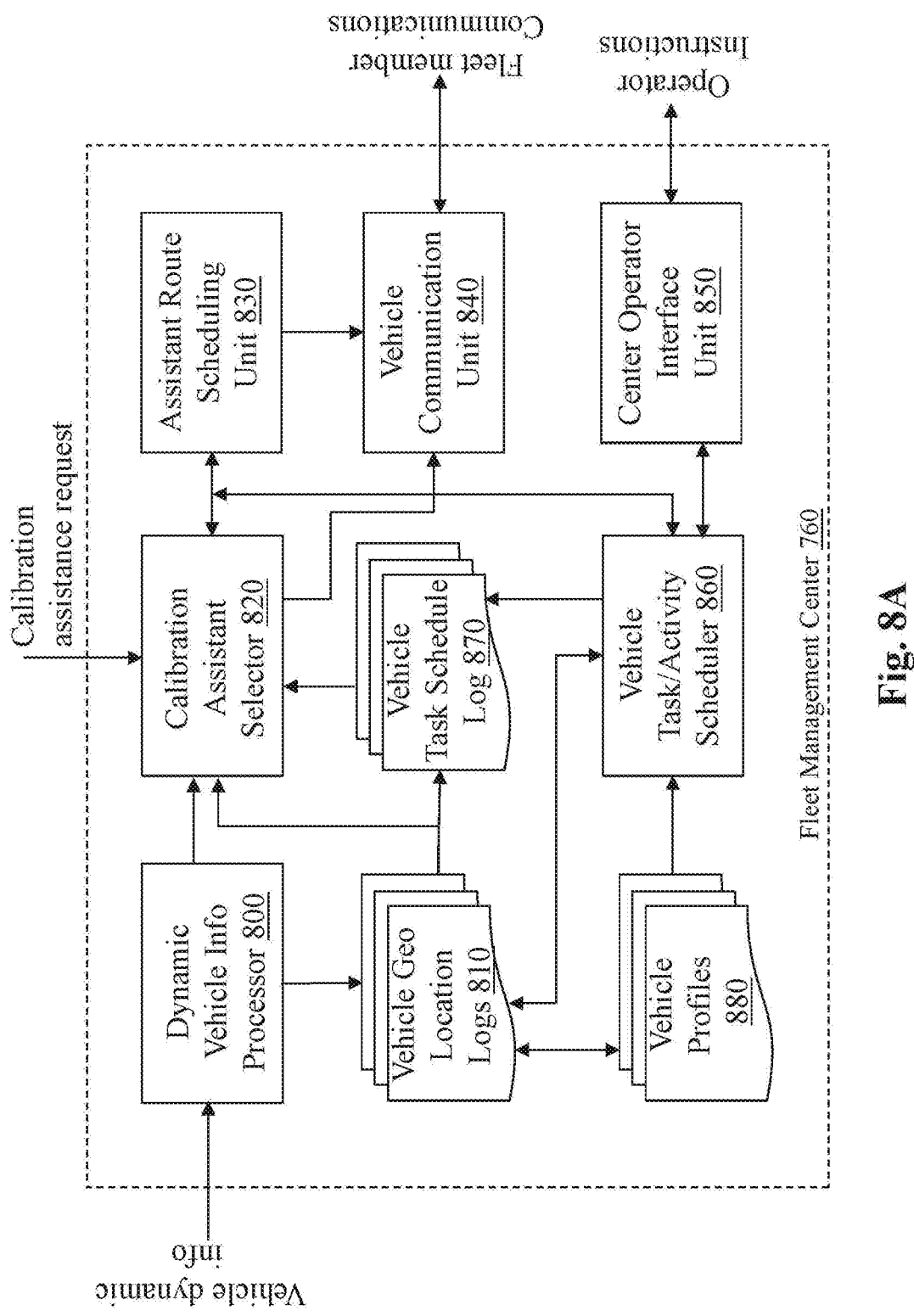
FIG. 8A depicts an exemplary high level system diagram of a fleet management center, in accordance with an embodiment of the present teaching.

FIG. 8A depicts an exemplary high level system diagram of the fleet management center 760, in accordance with an embodiment of the present teaching. In this illustrated embodiment, the fleet management center 760 may be used to both schedule vehicle activities (e.g., travel schedules of fleets and individual trucks) and their calibration assistance needs. To do so, the fleet management center 760 receives different types of information and make decisions accordingly. For instance, it may receive profile information about each vehicle, transportation needs from operators, and schedule fleets and/or individual trucks to fulfill the transportation needs. According to the scheduled activities, trucks may be dispatched, either individually or as a fleet, to the roads with specified destinations and schedules. While traveling, the vehicles continue to send relevant information to the fleet management center 760, including geo location, destination, task schedule, surrounding information (e.g., weather, etc.), and dynamically occurring issues. Maintaining such dynamic information enables the fleet management center 760 to keep track of current states of vehicles so that when the need for re-calibration arises from any of the vehicles, the fleet management center 760 may then select a collaborative calibration assistant based on the most updated information.

Figure 8B:
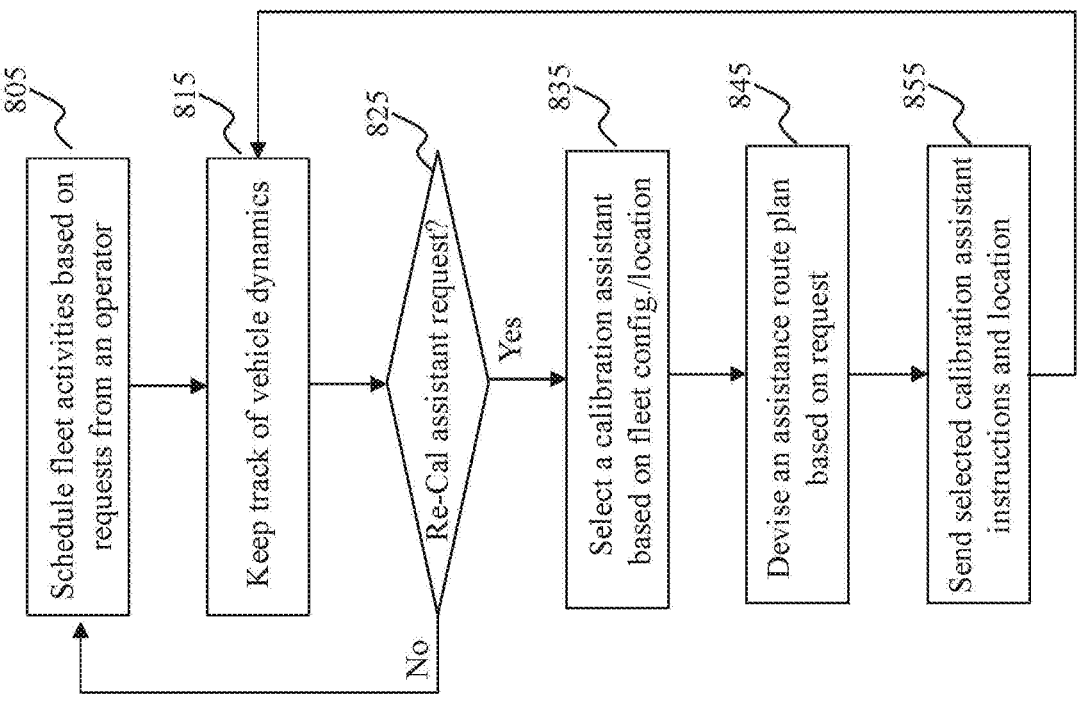
FIG. 8B is a flowchart of an exemplary process of a fleet management center, in accordance with an embodiment of the present teaching.

The fleet management center 760 comprises a dynamic vehicle information processor 800, a calibration assistant selector 820, an assistant route scheduling unit 830, a vehicle communication unit 840, a center operator interface unit 850, and a vehicle task/activity scheduler 860. FIG. 8B is a flowchart of an exemplary process of the fleet management center 760, in accordance with an embodiment of the present teaching. When the center operator interface unit 850 receives from an operator, it forwards the received requests to the fleet task scheduler 860. Based on the vehicle profiles stored in 880, the vehicle task/activity scheduler 860 schedules, at 805, fleet/vehicle activities based on the request in accordance with the vehicle profile information stored in storage 880. A profile of a vehicle may include information about features related to the vehicle's capacity in transportation, the sensor configuration on the vehicle (e.g., how many trailers it can be attached to, what sensors are deployed on which locations of the vehicle, what targets are present at which facets of the vehicle, etc.). Such information may be used to schedule activities based on needs as well as identify a collaborative calibration assistant.

The vehicle task/activity scheduler 860 may then generate one or more vehicle task schedules and store such schedules in a log 870, which specifies, e.g., which vehicle is dispatched to carry out which task, with which other vehicles, towards what destination, and current route planned, etc. In carrying out the scheduled activities, the dispatched vehicles may continue sending dynamic information to the fleet management center 760 so that it can keep track of, at 815, the dynamics associated with the vehicles. In managing the vehicles, the fleet management center 760 may check, regularly at 825, to see if any of the vehicles on the roads sends a request for collaborative calibration assistance. When there is no request for collaborative calibration, the fleet management center 760 continue to either schedule other vehicles for different activities at 805 or update records of vehicles' dynamic information stored in logs 810.

As discussed herein, an ego vehicle on the road may monitor its sensors' performance and detect whether any of the sensors deployed needs to be re-calibrated. In this illustrated embodiment, when such a need arises, the ego vehicle sends a request to the fleet management center 760. Upon r which will then select an appropriate assistant to coordinate with the ego vehicle to carry out the on-the-fly collaborative calibration. Upon receiving such a request, the calibration assistant selector 820 selects, at 835, an appropriate collaborative calibration assistant based on different types of information, e.g., the current geo location of the ego vehicle, the current geo locations of other vehicles (including other fleet members or other individually moving vehicles), whether each candidate vehicle has target(s) thereon that can be used to calibrate the sensor at issue on the ego vehicle, whether each candidate vehicle can be called upon to assist the requested collaborative calibration given its own scheduled task, whether the route a candidate vehicle is taking is consistent with the direction of the ego vehicle, etc. For instance, if an ego vehicle requests to calibrate two cameras, one in the front and one on the left side, then the assisting vehicle selected needs to have targets on its right side and on its back to support calibration of a front and left side cameras.

Once a candidate assisting vehicle is selected, the calibration assistant selector 820 may invoke the assistant route scheduling unit 830 to devise, at 845, a collaborative calibration route plan in accordance with the request from the ego vehicle. For instance, if the ego vehicle specifies that a front sensor and a side sensor on the left need to be re-calibrated, then a possible calibration route plan may include to have an assisting vehicle to approach the ego vehicle on its left first so that the sensor on the left side of the ego vehicle can be re-calibrated based on a target visible on the right side of the assisting vehicle. Then the route may dictate the assisting vehicle to then drive to the front of the ego vehicle so that the sensor at the front of the ego vehicle may be calibrated by relying on the target visible on the back of the assisting vehicle. Such a devised calibration route plan may then be sent, from the assistant route scheduling unit 830, to the vehicle communication unit 840, which then sends, at 855, the collaborative calibration instructions to the selected assisting vehicle with, e.g., additional information such as the location of the ego vehicle, means to communicate with the ego vehicle, etc. In this way, the requesting ego vehicle and the selected assisting vehicle can be connected to interact directly in order to coordinate to carry out the calibration plans.

Figure 9A:
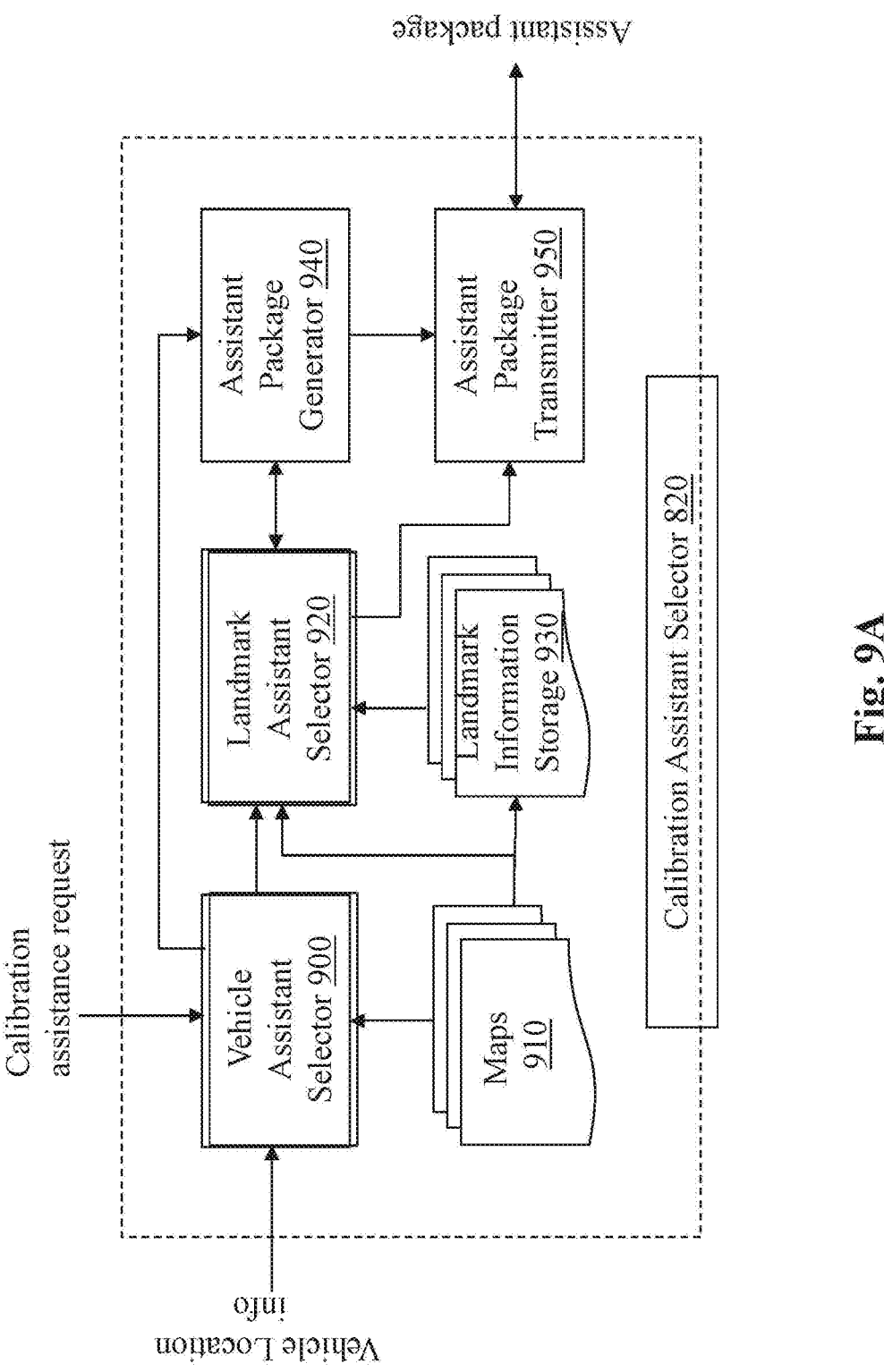
FIG. 9A depicts an exemplary high level system diagram of a calibration assistant selector, in accordance with an embodiment of the present teaching.
Figure 9B:
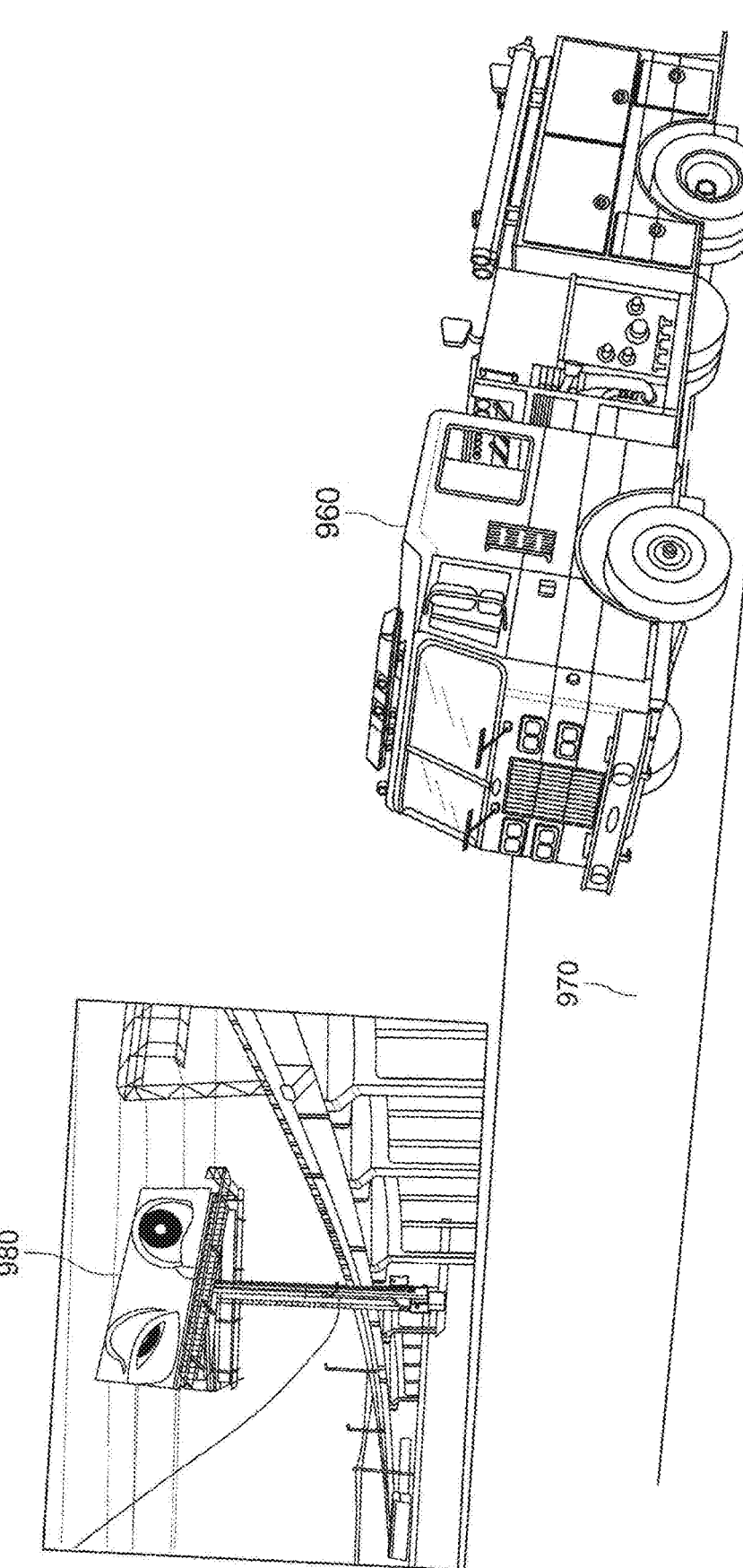
FIG. 9B illustrates an exemplary scenario of using a landmark as an assistant for calibrating a sensor while in motion, in accordance with an embodiment of the present teaching.

FIG. 9A depicts an exemplary high level system diagram of the calibration assistant selector 820, in accordance with an embodiment of the present teaching. In this illustrated embodiment, the calibration assistant selector 820 comprises a vehicle assistant selector 900, a landmark assistant selector 920, an assistant package generator 940, and an assistant package transmitter 950. As discussed herein, in collaborative calibration operation, the ego vehicle requests to have another vehicle, whether from the same fleet or elsewhere, to coordinate with it to achieve that. In some situations, a vehicle assistant may not be found. In this case, the calibration assistant selector 820 may instead select a landmark to assist the ego vehicle to achieve collaborative calibration. Such a landmark may be located along, e.g., some highway on the route the ego vehicle is on and may provide a target visible while the ego vehicle passes it or in the vicinity of it. Such a landmark may have a target thereon with known visual characteristics, which may be communicated to the ego vehicle prior to the calibration. This is illustrated in FIG. 9B, that shows an exemplary scenario of using a landmark as an assistant for calibrating a sensor while in motion, in accordance with an embodiment of the present teaching. As seen, an ego vehicle 960 is traveling on a road 970 and a camera on its front may need to be calibrated. The calibration assistant selector 820 may not be able to find a vehicle assistant to collaborate with the ego vehicle 960 to do the calibration on-the-fly. As an alternative, the calibration assistant selector 820 identifies a landmark 980, i.e., a billboard along the road 970 to assist the ego vehicle to calibrate. Such a selected landmark assistant may be communicated with the ego vehicle as to its location, orientation, etc. before the ego vehicle reaches where the landmark it. Information about what the ego vehicle expects to "see" on the billboard and the visual features of the target on the billboard may also be communicated to the ego vehicle. The ego vehicle may also be instructed to travel in a particular lane in order to observe the expected visual features in a precise manner. The ego vehicle may also be informed of a geo range within which the ego vehicle may control its sensor to be calibrated to capture an image of the target on the landmark so that known features may be extracted from the image and used for calibrating the sensor. A landmark is not limited to a billboard. It can be any structure (e.g., a building, a structure, etc.) with known pose, orientation, and other target characteristics, which may be visual or non-visual to facilitate calibration. For instance, for calibrating a camera sensor, landmarks with known visual features may be used to assist an ego vehicle to perform collaborative calibration on-the-fly. For calibrating a different type of sensor, e.g., a sensor to sense depth such as a LiDAR, landmarks with known depth related dimension information may be exploited for collaborative calibration. For example, to calibrate a pair of stereo cameras, a landmark with known geo coordinate information may be used for calibration. In such a way, a landmark can be used as an assistant to an ego vehicle for calibrating a sensor on-the-fly.

Figure 9C:
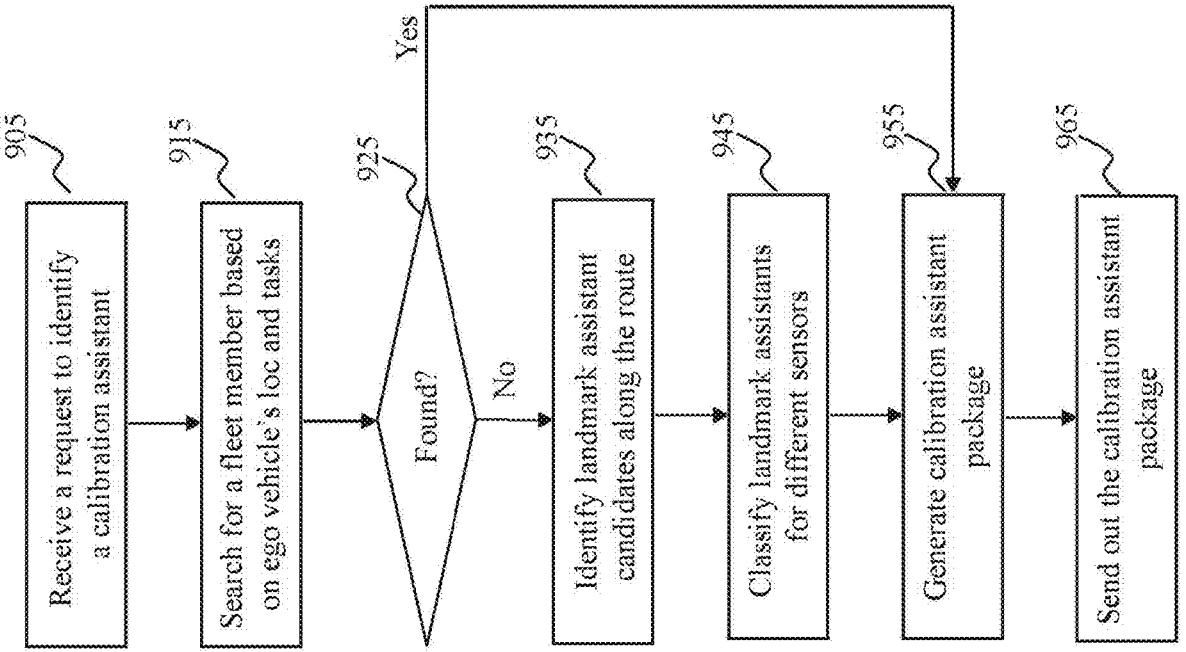
FIG. 9C is a flowchart of an exemplary process of a calibration assistant selector, in accordance with an embodiment of the present teaching.

FIG. 9C is a flowchart of an exemplary process of the calibration assistant selector 820, in accordance with an embodiment of the present teaching. In operation, upon receiving at 905 a request to identify a collaborative calibration assistant, the vehicle assistant selector 900 searches, at 915, an appropriate vehicle as a collaborative calibration assistant and such a search may be based on different types of information. For example, geographical vicinity may be a requirement. Whether the vehicle assistant candidate possess needed targets thereon to allow the requested calibration may be another requirement. In some embodiments, if a vehicle is associated with an urgent task, it may not be used as an assistant even when it otherwise satisfies all requirements. Such a selected vehicle assistant may or may not be a fleet member. If such a vehicle member is found, a vehicle assistant may be used for the collaborative calibration. If not found, the vehicle assistant selector 900 may then invoke the landmark assistant selector 920 to identify, at 935, a landmark to assist in collaborative calibration. Each identified landmark assistant is to be located along the route that the ego vehicle is to pass through. In some embodiments, a different priority may be used, i.e., a landmark assistant may be preferred and only if there is no landmark available, the selector 820 is to identify a vehicle assistant.

For each sensor to be re-calibrated, the landmark assistant selector 920 may identify different landmarks. For instance, while calibrating a camera requires visual information with known visual characteristics, when the sensor needing calibration is a LiDAR sensor, then no visual feature on the assistant is needed but rather the assistant landmark needs to have spatial properties such as a distribution of depth when perceived from a certain location. Each of the landmark assistant so identified may be associated with a specific sensor to be re-calibrated and the landmark assistant selector 920 may classify, at 945, as such. With either the vehicle assistant or the landmark assistant selected, a calibration assistant package may be generated, at 955 by the assistant package generator 940 and then sent out, at 965, by the assistant package transmitter 950. Such a package may specify how each assistant, whether vehicle or landmark, is to be used to assist to perform collaborative calibration with respect to which sensor on the ego vehicle.

Figure 10A:
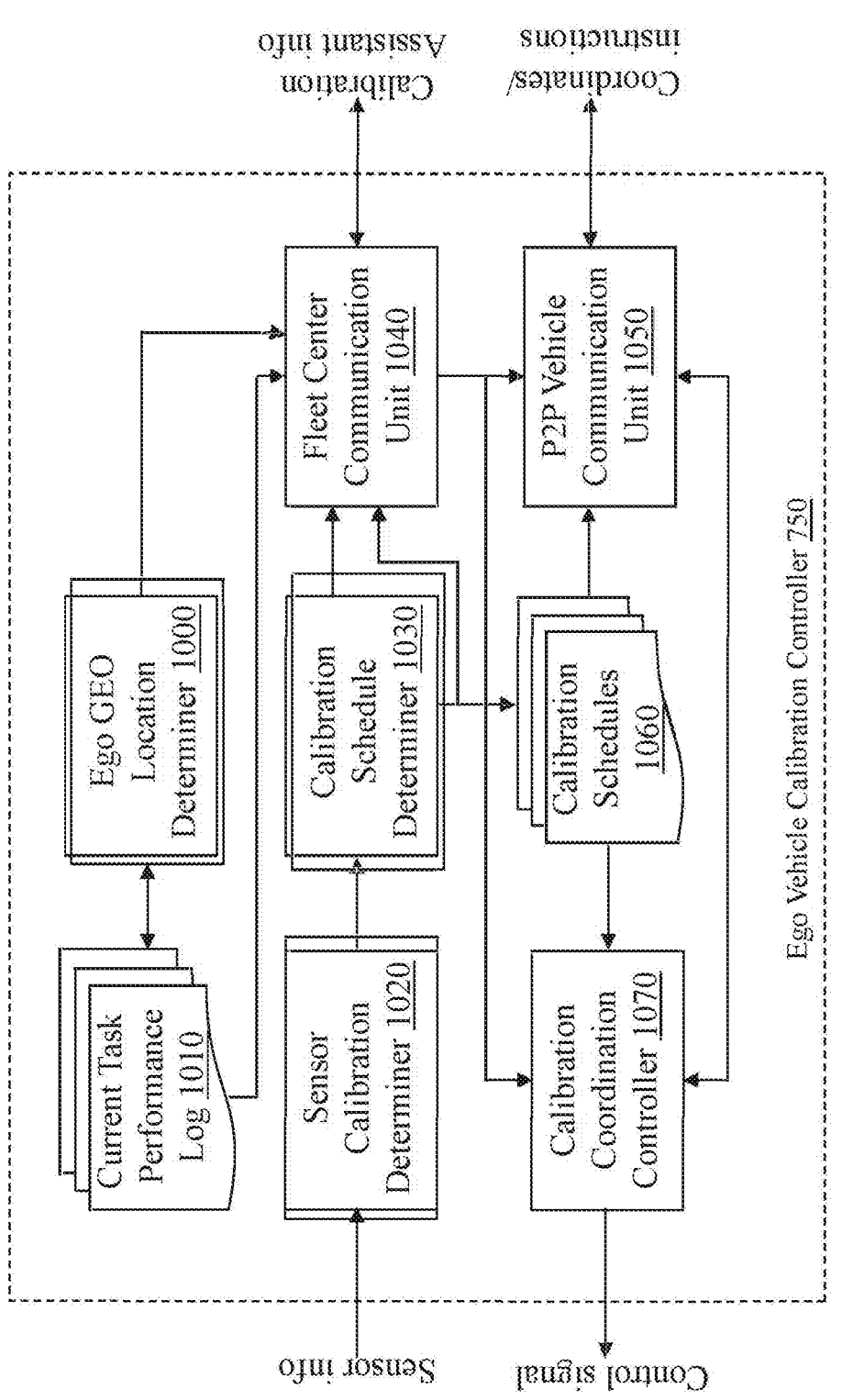
FIG. 10A depicts an exemplary high level system diagram of an ego vehicle calibration controller, in accordance with an embodiment of the present teaching.

FIG. 10A depicts an exemplary high level system diagram of the ego vehicle calibration controller 750, in accordance with an embodiment of the present teaching. An ego vehicle is one that has a need to calibrate on-the-fly via collaborative calibration. Each vehicle may be equipped with different operational software modules, such as one that controls ego vehicle's calibration needs (the ego vehicle calibration controller 750) and one that can be used to assist an ego vehicle's need for calibrating on-the-fly (collaborative calibration assistant 720), which can be activated to carry out the intended functions when a corresponding need arises. Given that, each vehicle can be an ego vehicle or a collaborative calibration assistant in different situations.

Figure 10B:
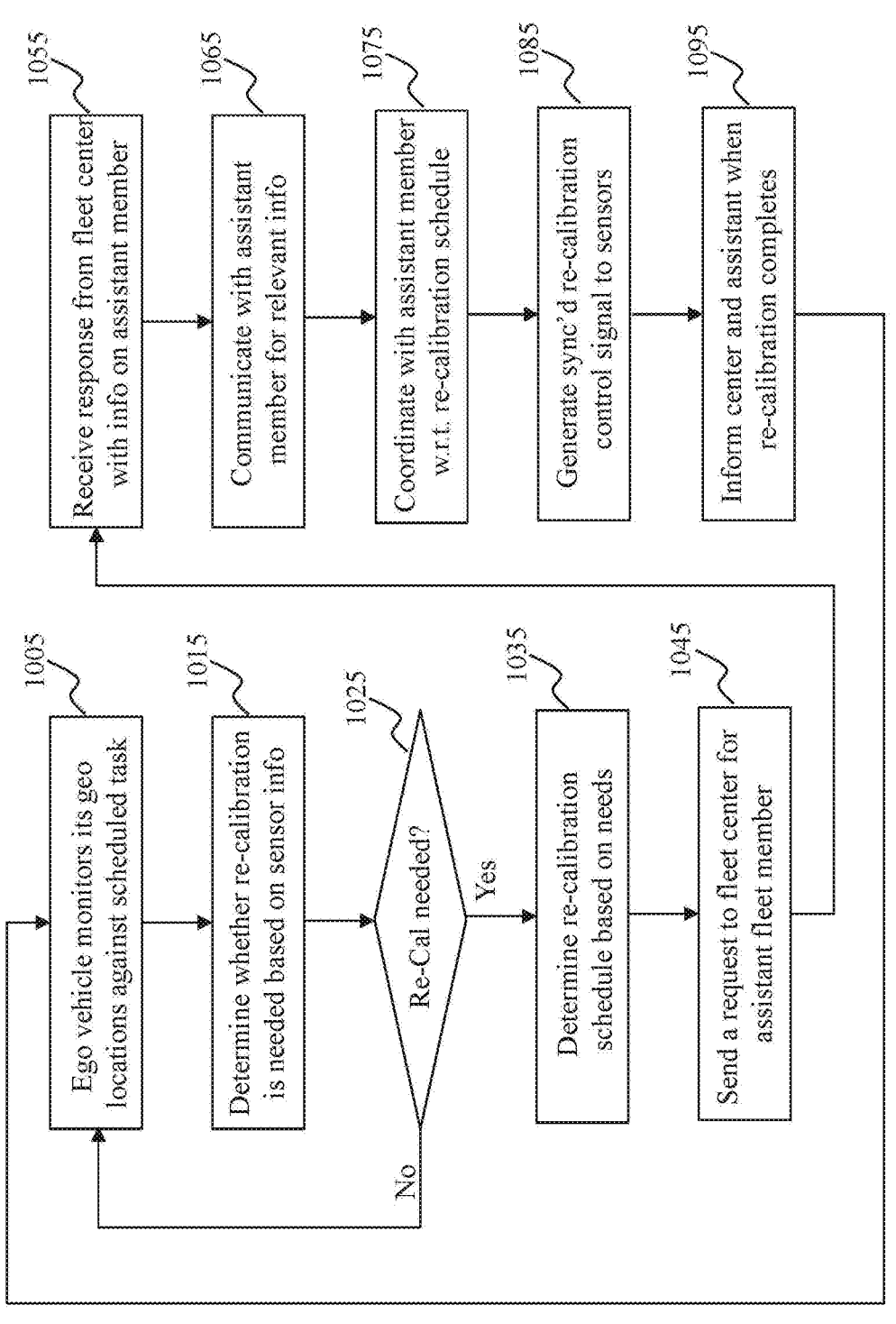
FIG. 10B is a flowchart of an exemplary process of an ego vehicle calibration controller, in accordance with an embodiment of the present teaching.

In this illustrated embodiment, the ego vehicle calibration controller 750 comprises an ego GEO location determiner 1000, a sensor calibration determiner 1020, a calibration schedule determiner 1030, a fleet center communication unit 1040, a peer-to-peer (P2P) vehicle communication unit 1050, and a calibration coordination controller 1070. FIG. 10B is a flowchart of an exemplary process of the ego vehicle calibration controller 750, in accordance with an embodiment of the present teaching. In operation, the ego geo location determiner 1000 in the ego vehicle calibration controller 750 continuously monitors, at 1005, its own geo locations and records its moving geo locations in a current task performance log 1010. To facilitate collaborative calibration, such tracked geo locations are also reported to the fleet management center 760. In addition to tracking its own positions, the sensor calibration determiner 1020 of the ego vehicle calibration controller 760 may also monitor information acquired by different sensors deployed on the vehicle in order to determine, at 1015, which sensor may require re-calibration. In some embodiments, such a determination may be made based on quality of the received sensor data. Other means may also be used to detect whether a sensor needs to be re-calibrated. If no sensor needs to be re-calibrated, determined at 1025, the ego vehicle calibration controller 760 continues to monitor its own dynamic positions at 1005 and/or determine whether there is an upcoming need for a sensor to be re-calibrated.

When a need for calibrate a sensor is detected, determined at 1025, the calibration schedule determiner 1030 may be invoked to determine, at 1035, e.g., how urgently the calibration should happen, accordingly generates a schedule for the needed calibrations, and then stores such generated schedule in 1060. Once the schedule(s) for needed calibration are generated, the fleet center communication unit 1040 sends, at 1045, a request to the fleet management center 760 for collaborative calibration. As discussed herein, such a request may include additional relevant information needed to fulfill the request, e.g., the geo location of the ego vehicle, the destination the ego vehicle is heading to, the tasks the ego vehicle has at hand with limitations (e.g., when to deliver the goods at the destination), sensors to be re-calibrated, the physical position and characteristics of such sensors, nature of the problem identified (e.g., a camera is off from its mounted position), and optionally the schedule for the re-calibration (e.g., as the camera is used to estimate depth of obstacles, the ability of the ego vehicle to work in an autonomous driving mode is negatively impacted without it).

Upon receiving a request for collaborative calibration, the fleet management center 760 may then search for a collaborative calibration assistant appropriate for the ego vehicle and inform the fleet center communication unit 1040, e.g., information about the selected collaborative calibration assistant such as its current geo location, estimated time of arrival, contact information, etc. With the fleet center communication unit 1040 receives, at 1055, the response from the fleet management center 760 with information about the selected assistant, the P2P vehicle communication unit 1050 may then communicate, at 1065, with the selected assisting vehicle to exchange relevant information between the ego vehicle and the assisting vehicle, e.g., current location and contact information of each vehicle, traveling speed of each vehicle, distance between the two vehicles, the precise coordinates of each vehicle. Such information may then be used by the calibration coordination controller 1070 to coordinate, at 1075, the activities between the ego vehicle and the assisting vehicle to collaboratively achieving the calibration on-the-fly.

The coordination between the ego vehicle and the assisting vehicle may include when to calibrate which sensor and which position (e.g., front, back, left, or right) the assisting vehicle needs to be in order to assist the ego vehicle to calibrate the particular sensor, etc. The coordination may be carried out by the calibration coordination controller 1070 based on the calibration schedule generated by the calibration schedule determiner 1030. As a result of the coordination, the calibration coordination controller 1070 may generate, at 1085, instructions for the assisting vehicle and send to the P2P vehicle communication unit 1050 so that such information may be sent to the assisting vehicle. In addition, the calibration coordination controller 1070 may also generate control signals to ego vehicle control mechanism (not shown) so that the ego vehicle may autonomously drive in a way that is consistent with the coordinated activities with respect to the assisting vehicle. When the collaborated calibration according to the calibration schedule in 1060 is completed, the P2P vehicle communication unit 1050 informs, at 1095, the assisting vehicle and the fleet management center 760 (via the fleet center communication unit 1040).

As discussed herein, in some situations, when an assisting vehicle is not found and/or when the embodiment of using a landmark to assist the ego vehicle to perform calibration, the fleet management center may send the calibration assistant information to indicate a landmark reachable by the ego vehicle (e.g., along its travel route). In such embodiments, the calibration assistant information may provide a description of the nature of the landmark (e.g., a billboard, a building, etc.), the geo pose (location/orientation) of the landmark, expected 2D or 3D characteristics of the landmark (that can be used as ground truth) as a function of the perspective, and instructions, such as which lane the ego vehicle may need to be in when approaching the landmark as well as the geo range for the ego vehicle to observe in order to activate its sensor to capture the landmark information. In such embodiments, the functions of the calibration coordination controller 1070 may differ from that for collaborative calibration via an assisting vehicle. For instance, when information related to the selected landmark is received by the fleet center communication unit 1040 (see FIG. 10A), the received information may be provided to the calibration coordination controller 1070 which may then generates, appropriate control signals to control the ego vehicle to approach the identified landmark (e.g., get into a certain lane on a certain road), control the sensor to be calibrated to gather intended information related to the landmark (e.g., control a camera to capture an image of the landmark while in a certain range relative to the landmark), analyze the captured information (e.g., analyze the sensed depth information from the sensor and compared with the ground truth depth information from the center), and then calibrate the sensor accordingly based on the discrepancy (or lack thereof) between the sensed information and the ground truth information received from the center.

Figure 11A:
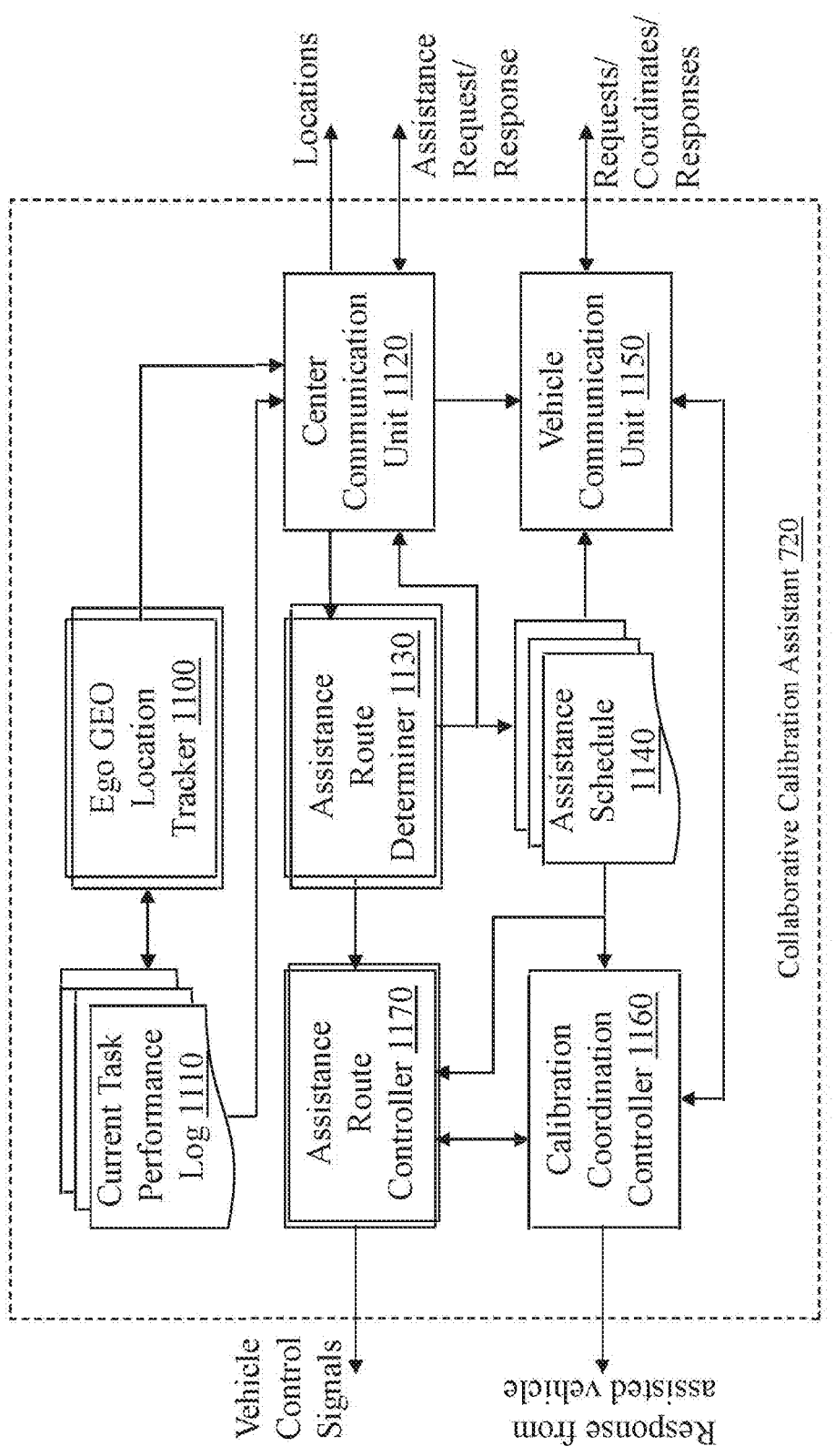
FIG. 11A depicts an exemplary high level system diagram of a calibration assistant, in accordance with an embodiment of the present teaching.

FIG. 11A depicts an exemplary high level system diagram of the collaborative calibration assistant 720, in accordance with an embodiment of the present teaching. As discussed herein, a collaborative calibration assistant (i.e., an assisting vehicle) may be selected by the fleet management center 760 or by responding to a posted request from an ego vehicle asking for collaborative calibration assistance. Once the assisting vehicle is determined, it is scheduled to travel to where the ego vehicle is and maneuver around the ego vehicle to assist the ego vehicle to calibrate one or more sensors. To do so, different types of information are communicated to the assisting vehicle such as the geo location of the ego vehicle, a number of sensors that need to be calibrated and their relative positions with respect to the ego vehicle, and optionally information about a schedule or a sequence by which different sensors on the ego vehicle are to be calibrated via collaboration.

Figure 11B:
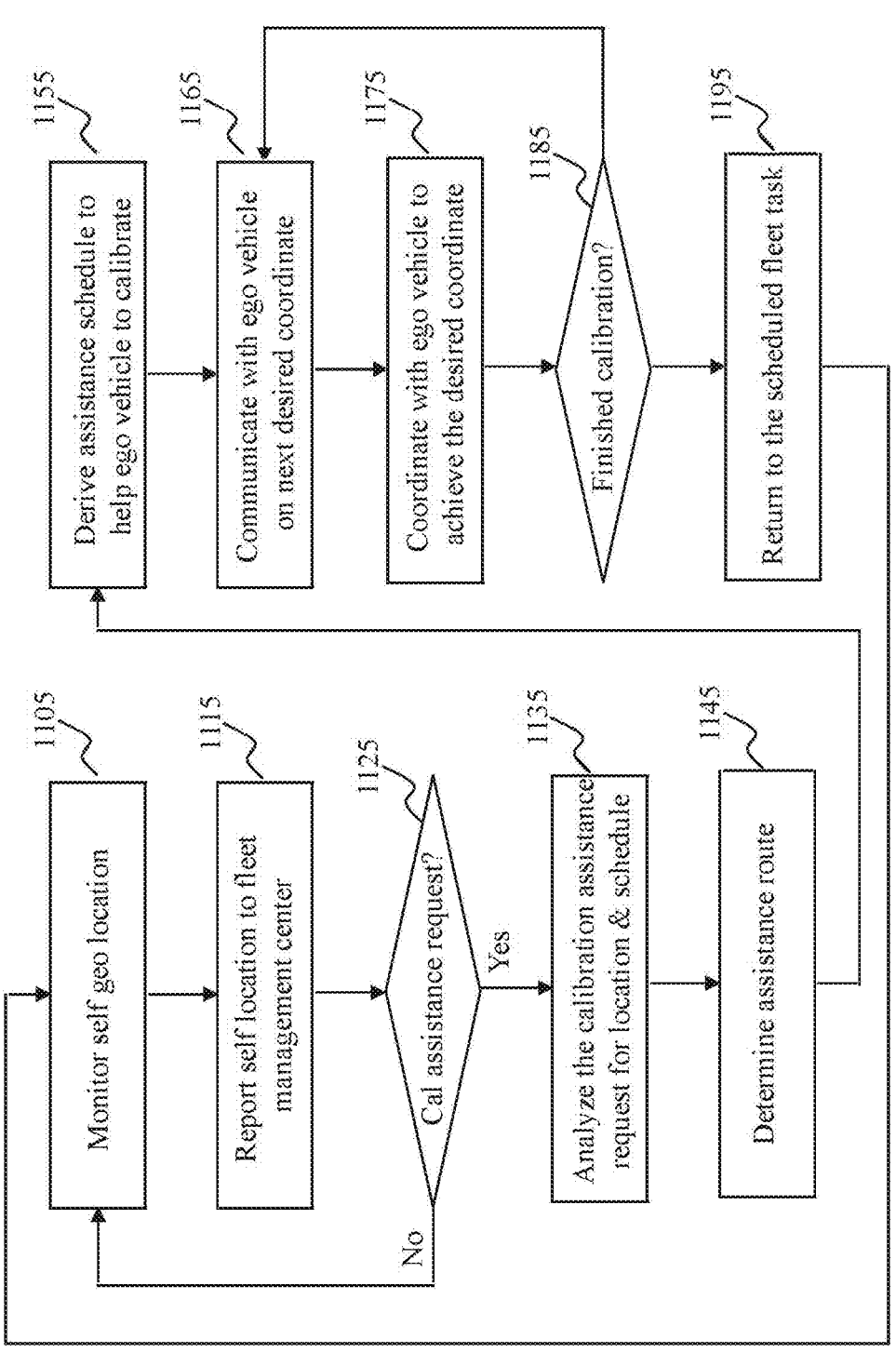
FIG. 11B is a flowchart of an exemplary process of a calibration assistant, in accordance with an embodiment of the present teaching.

In this illustrated embodiment, the collaborative calibration assists 720 comprises an ego geo location tracker 1100, a center communication unit 1120, an assistance route determiner 1130, a vehicle communication unit 1150, a calibration coordination controller 1160, and an assistance route controller 1170. FIG. 11B is a flowchart of an exemplary process of the collaborative calibration assistant 720, in accordance with an embodiment of the present teaching. To participate in collaborative calibration framework 700, the ego geo location tracker 1100 monitors, at 1105, the dynamic geo locations of the assisting vehicle and reports, at 1115, such tracked locations to the fleet management center 760 via the center communication unit 1120. Such tracking and reporting activities continue to happen so that the fleet management center 760 is aware of the current locations of all vehicles under its management.

In some embodiments, the assisting vehicle is selected by the fleet management center 760. In this case, the center communication unit 1120 receives, determined at 1125, an assistance request from the fleet management center 760. In some embodiments, the assisting vehicle is selected by, e.g., the ego vehicle when the assisting vehicle responds to a request posted by the ego vehicle for collaborative calibration (not shown). In either situation, the assisting vehicle receives, with the request, relevant information to be used to carry out the activities to assist in collaborative calibration. Upon receiving the request with the relevant information, the assistance route determiner 1130 analyzes, at 1135, the request to determine the location of the ego vehicle and accordingly determines, at 1145, a route to be taken to travel to the ego vehicle. The assistance route determiner 1130 may also analyzes the relevant information such as the sensors scheduled to be calibrated and their physical positions (e.g., on left side, in the front, or on the right side) with respect to the ego vehicle and derive, at 1155, some associated schedule or plan (e.g., first approach the back of the ego vehicle so that the sensor in the back can get calibrated, then go to the left side of the ego vehicle so that the sensor on the left of the ego vehicle can be calibrated, etc.). Such an assistance schedule may be stored in 1140.

With such generated assistance route and schedule, the assisting vehicle communicates, at 1165 via the vehicle communication unit 1150, with the ego vehicle to coordinate the collaboration. For example, the assisting vehicle may inform the ego vehicle the route it is taking to get there, the estimate arrival time, the derived assistance schedule (e.g., sequence of positions the assisting vehicle will be and the corresponding sensors to be calibrated, etc.). The calibration coordination controller 1160 then coordinates, at 1175, with the ego vehicle in the entire process in accordance with the assistance schedule along the route planned, one calibration at a time until all sensors that need to be re-calibrated are calibrated, determined at 1185. During the calibration process, the assistance route controller 1170 generates control signals needed to maneuver the assisting vehicle in the manner planned. At the completion of the calibration, the assisting vehicle may then return, at 1195, to the task scheduled prior to the collaborative calibration.

With the collaborative calibration framework as discussed herein, an ego vehicle in motion may calibrate its sensors on-the-fly when a calibration assistant can be identified, whether it is another moving vehicle or a landmark. This framework may be particularly effective when the ego vehicle is a member of a fleet so that another fleet member nearby may be called upon to assist the calibration. The alternative of using a landmark to assist on-the-fly calibration may be invoked in different situations. In the discussion above, a landmark assistant may be used when an assisting vehicle is not found. In some embodiments, a landmark assistant may be preferred over an assisting vehicle due to various considerations, e.g., when the road condition makes it riskier to use an assisting vehicle, a landmark assistant may be instead used. Other conditions may also have a determining effect in terms of using a landmark assistant or an assisting vehicle for collaborative calibration. For example, the time of day (day light or night), the level of observed congestion of the road the ego vehicle is, the clarity of the landmarks to be encountered within a time frame specified to have the calibration completed, etc. Different details and aspects to be considered in implementing the present teaching are all within the scope of the present teaching.

Figure 12A:
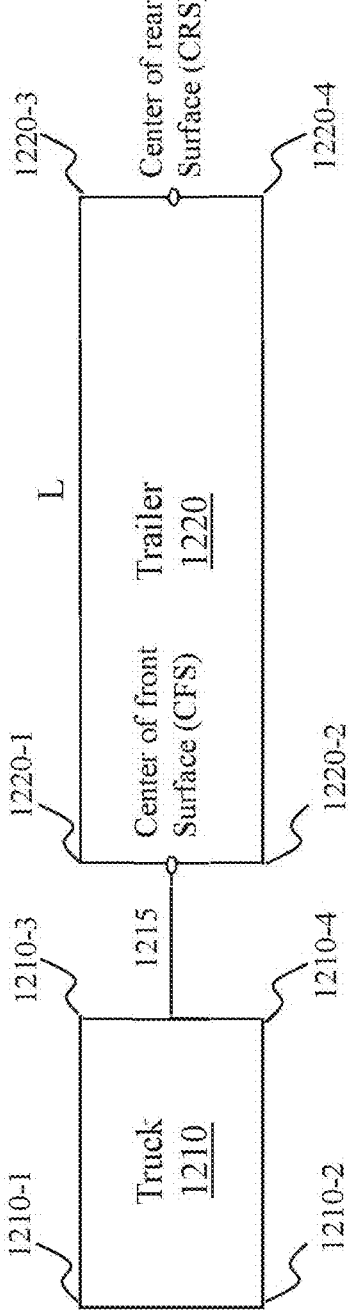
FIGS. 12A-12C illustrate an exemplary configuration of a truck and a trailer with exemplary critical points representing the pose of the trailers in relation to the truck, in accordance with an exemplary embodiment of the present teaching.
Figure 12B:
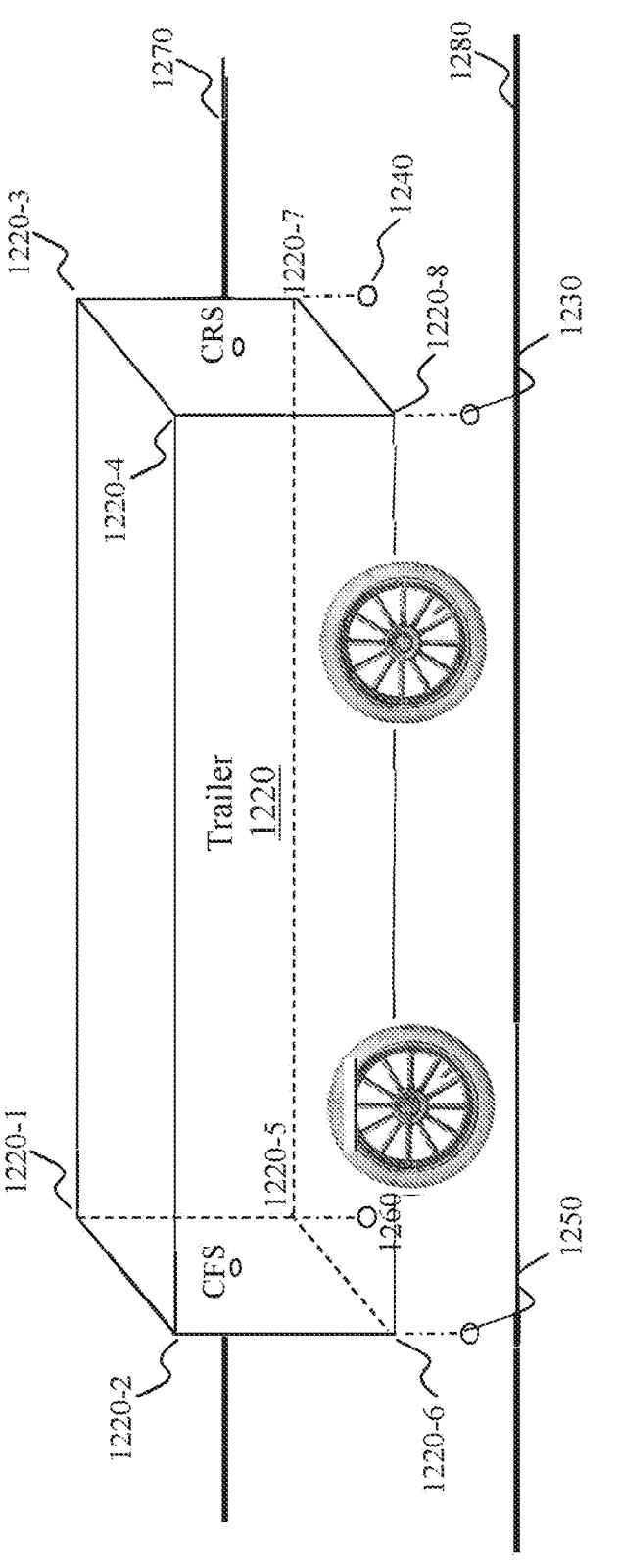
Figure 12C:
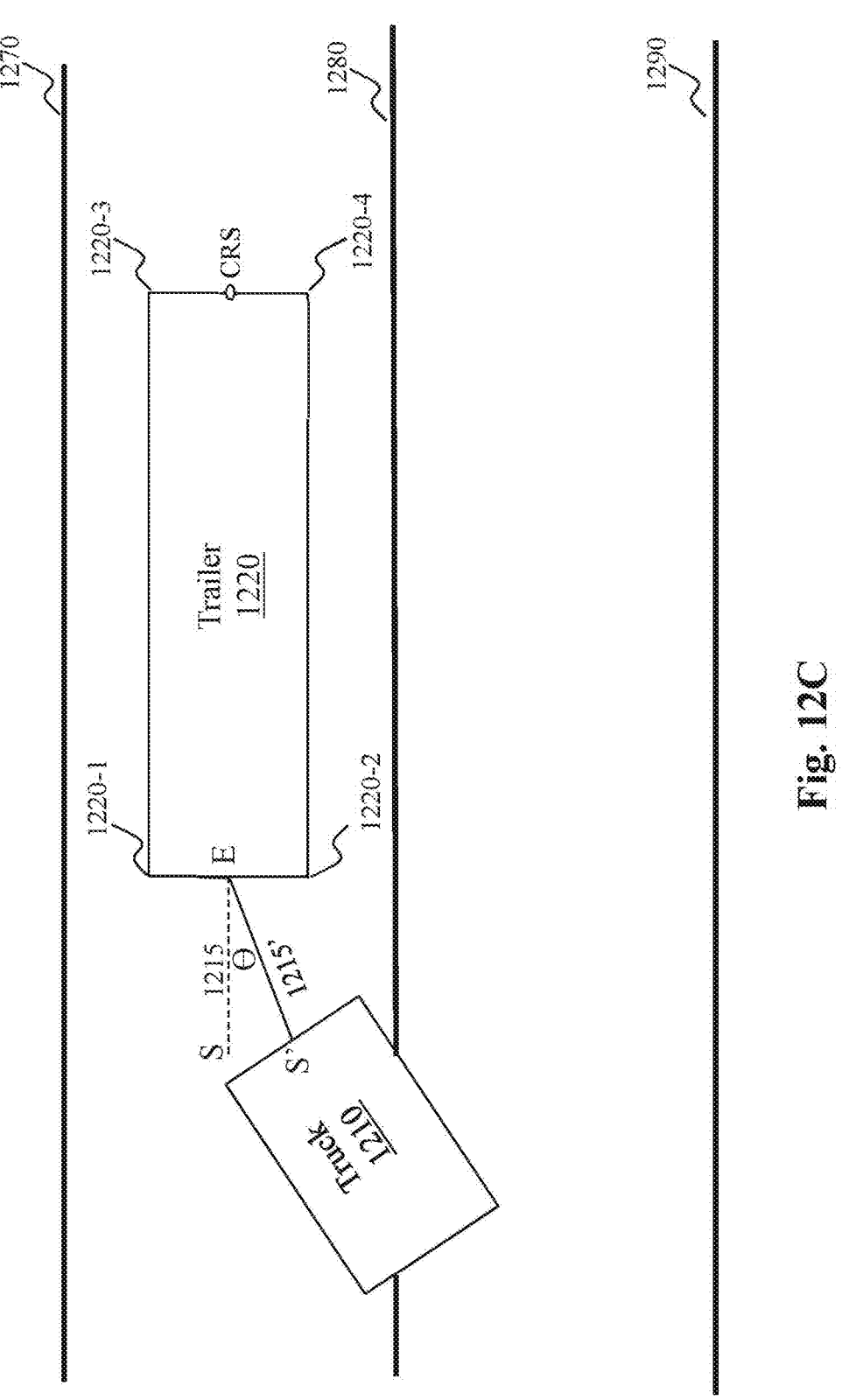

As discussed herein, in addition to the extrinsic needs to re-calibrate sensors via collaboration, there are also situations where intrinsic needs related to autonomous driving arise. One example is illustrated in FIGS. 2A-2B, where a truck with trailer(s) attached thereto need to monitor the pose of each trailer in order to ensure that the entire truck/trailer configuration is where it should be (e.g., within the same lane). FIGS. 12A-12C further illustrate different configurations between a truck and its trailer and the need to be aware in autonomous driving of the trailer pose to ensure appropriate control of the trailer in connection with the truck to ensure safety. In FIG. 12A, a single trailer 1220 is attached with a truck 1210 via a rigid connector 1215. In this exemplary configuration, the truck 1210 may have different feature points characterizing its pose, e.g., top corner points (vertices) 1210-1, 1210-2, 1210-3, and 1210-4. The pose of trailer 1220 may also be characterized using its respective feature points. For instance, for controlling the autonomous driving to ensure that the trailer is in the same lane as the truck 1210, it may be adequate to know the position of a center point on the rear surface (CRS) of trailer 1220, which can be determined based on a center point on the front surface (CFS) of trailer 1220 given the dimension of the trailer (e.g., the length L) is known. In some embodiments, other features points may also be used to characterize the pose of trailer 1220, e.g., four center points on each of the vertical surfaces of trailer 1220 may be used to characterize its pose.

Camera installed (either on the rear surface of truck 1210 or front surface of trailer 1220) may be calibrated when the truck 1210 and the trailer 1220 are in a known configuration. This is shown in the top view in FIG. 12A, where corner points 1210-1 and 1210-3 and 1210-2 and 1210-4 may form two parallel lines that are substantially parallel to the connector 1215 as well as lines formed by corner points on trailer 1220. That is, line 1220-1-1220-3 and line 1220-2-1220-4 are substantially parallel lines 1210-1 and 1210-3 and 1210-2 and 1210-4, respectively. Target observed in this known configuration and featured extracted therefrom may form a reference target.

FIG. 12B provides a perspective view of the trailer 1220. In addition to the top corner points 1220-1, 1220-2, 1220-3, and 1220-4, bottom corner points 1220-5, 1220-6, 1220-7, and 1220-8 may also be used to characterize the pose of trailer 1220. Assuming that the trailer 1220 is a rigid rectangular prism, then a top corner point (e.g., 1220-4) and a corresponding bottom corner point (e.g., 1220-8) are projected to the same point 1230 on the ground. Similarly, other pairs of top and bottom corner points may also project to the same point on the ground (1240, 1250, and 1260). To ensure that the trailer 1220 is within a lane (formed by two lane marks 1270 and 1280), an autonomous driving truck may determine the position of the trailer by estimating the coordinates of designated feature points on the trailer 1220. For instance, CFS and CRS may be estimated. As another example, corner points (at least some on top or bottom) may also be determined based on, known dimension of trailer 1220. Thus, there is a need for an autonomous truck to continuously estimate such feature points on-the-fly to provide a pose representation to the truck.

As discussed herein, when the truck 1210 and the trailer 1220 are aligned, as illustrated in FIG. 12A, the connector 1215 is parallel to the sides of the truck 1210 and the trailer 1220. The camera can be calibrated in this configuration and establish a reference feature point set by observing the target on the opposing surface and identify a plurality of features points in the target. Such reference feature point set detected during calibration may be used to estimate a transformation between reference target feature points and a future target feature points based on planar homograph. Such a transformation (rotation and translation) may then be used to estimate the pose of trailer 1220.

Denote I_θ to be a target image (either on the front surface of the trailer or the back surface of the truck) acquired initially, which may be during the calibration or at the beginning of estimating trailer pose or during initialization or when the system has just started when the truck-trailer is in a known safe state. Denote image I_t to be a subsequent image of the target at time t, t>θ. The task is to estimate the pose difference between I_θ and I_n. That is, the trailer pose is estimated based on how the target differs at time t as compared with that at time θ. Thus, image I_θ serves as a reference. To perform homograph, a set of 2D feature points are identified from I_θ. Similarly, these 2D feature points are also identified from the target image I_t at time t. In some embodiments, a minimum number of feature points are needed, e.g., at least four feature points. In general, to overcome noise effect, more feature points may be used in homograph.

Denote the coordinate of a feature point by $$\begin{bmatrix} x \\ y \end{bmatrix}.$$

Assume that there are N feature points from I_θ and I_t, respectively, the transformation matrix may be computed such that $$\begin{bmatrix} x_t \\ y_t \\ 1 \end{bmatrix} = H \begin{bmatrix} x_0 \\ y_0 \\ 1 \end{bmatrix} \tag{1}$$

To determine H, one can use any known approach to obtain H. In some embodiments, a Direct Linear Transform (DLT) based solution may be used. Rearranging the above equation, one has $A \cdot h = 0$, where A is a $2N \times 9$ matrix and h is a $9 \times 1$ vector, as shown below.

$$h = \begin{bmatrix} H_{00} \\ H_{01} \\ H_{02} \\ H_{10} \\ H_{11} \\ H_{12} \\ H_{20} \\ H_{21} \\ H_{22} \end{bmatrix} \tag{2}$$

$$A = \begin{bmatrix} a_{X_1}^T \\ a_{Y_1}^T \\ a_{X_2}^T \\ a_{Y_2}^T \\ \cdot \\ \cdot \\ \cdot \\ a_{X_N}^T \\ a_{Y_N}^T \end{bmatrix} \tag{3}$$

Where $a_x^T = [-x_0, \ -y_0, \ -1, \ 0, \ 0, \ 0, \ x_t x_0, \ x_t y_0, \ x_t]$
$a_y^T = [0, \ 0, \ 0, \ -x_0, \ -y_0, \ -1, \ y_t x_0, \ y_t y_0, \ y_t]$ Vector h may be solved using different techniques, e.g., singular value decomposition (SVD) or sum of squared errors (SSE). The $1 \times 9$ vector h may be re-shaped into H, where H is a $3 \times 3$ matrix:

$$H = \begin{bmatrix} H_{00}, & H_{01}, & H_{02} \\ H_{10}, & H_{11}, & H_{12} \\ H_{20}, & H_{21}, & H_{22} \end{bmatrix} \tag{4}$$

To preserve 8 degrees of freedom, $H_{22}$ may be set to zero. H matrix may be normalized by dividing each of the elements in H by the L2-norm of the H matrix.

Such obtained H may be decomposed into different degree of freedom, such as rotation R and translation t (R, t). Such derived R and t represent the motion of the camera with respect to the trailer face. Such motion parameters of the camera may then be used to convert to the trailer's rotation (R') and translation (t') via the following:

$$R' = R^T \tag{5}$$

$$t' = -R^T \cdot t \tag{6}$$

Such determined motion parameters for the trailer may then be used to compute the pose of the trailer according to the following. Assume that the trailer is a rigid body, then the rotation of the front face with respect to the camera ($R^T$) is the same as the rotation of the rear face of the trailer. The translation of the rear face of the trailer may then be computed accordingly. For example, with respect to one selected point, e.g., the center of the front face of the trailer, is Tf=[$T_X$, $T_Y$, $T_Z$], if the length of the trailer is L, then the center point of the rear face is Tr=[$T_X$, $T_Y$, $T_Z$+L]. Then the pose of this selected center point after the motion is the following:

$$Tf'=[R't']*Tf \qquad (7)$$

$$Tr'=[R't']*Tr \qquad (8)$$

In some embodiments, the center point of the front and/or the rear face may be used to represent the pose of the trailer. In different situations, this may be adequate for the purpose of vehicle control to ensure that the trailer and the truck are to be in the same lane. In some situations, more points may be needed to be more precise. For instance, the top corner points as shown in FIGS. 12A-12C may be estimated to represent the pose of the trailer 1220. To do so, the top corner points on the front face of the trailer 1220 prior to transformation may be first determined based on, e.g., the known dimension of the trailer. Each of such top corner points from the front face may be represented as $T_f$. Then a top corner point on the rear face prior to the transformation and corresponding to $T_f$ may be derived based on L and represented as $T_r$. All such rear top corner points are then used to apply the rotation R' and translation t' to derive the top corner points after the transformation to obtain $T_r$'s to represent the pose of the trailer.

The estimation of the transformation may be applied while the truck and trailer are in motion. This is particularly important when, e.g., the truck 1210 makes a change from one lane (within 1270 and 1280) to the adjacent one (within 1280 and 1290), as shown in FIG. 12C. In this case, the truck 1210 and the trailer 1220 are no longer in alignment or there is a transformation. Such a transformation makes the target observed by the camera visually different, i.e., the feature points observable from the target image may now be shifted or morphed from the initial positions in image I_0 to positions in I_n due to the transformation. Such changes in detected corresponding feature point positions are used, as discussed herein, to compute the transformation matrix H, which may then be decomposed to obtain R and t for computing R' and t' for determining the pose of the trailer.

Figure 13B:
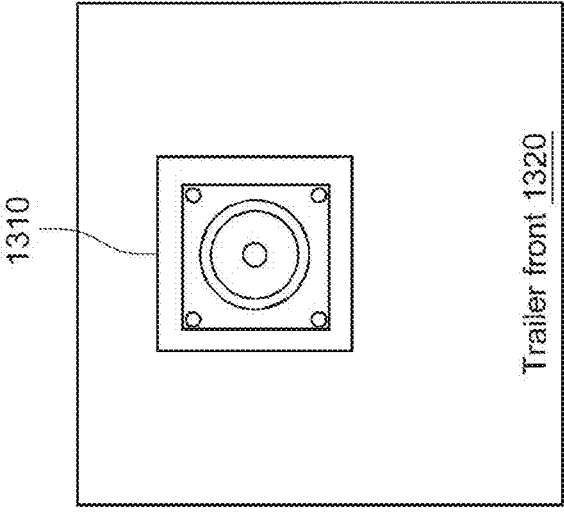
Figure 13B:
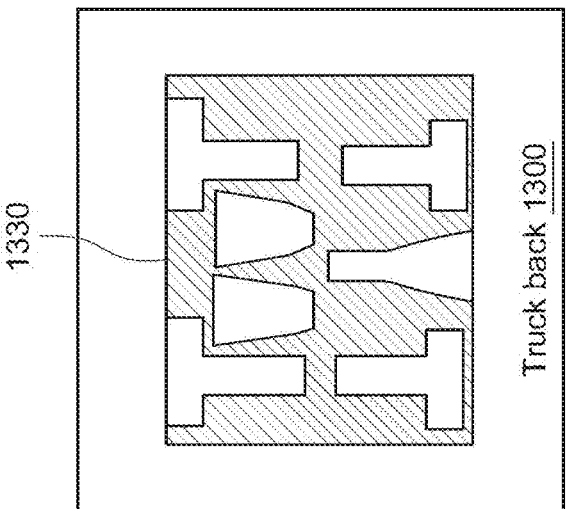

To estimate the transformation, the opposing surfaces of the truck 1210 and the trailer 1220 may be used to place a camera on one of the opposing surfaces that is to observe visual features (or changes thereof) of a target or a fiducial marker present on the other surface. The observed visual features may then be used to compared with stored reference visual features of the fiducial marker and the discrepancies may be used to compute the transformation. FIGS. 13A-13B show different arrangements of sensor and fiducial marks with respect to truck/trailer configurations for trailer pose estimation, in accordance with an embodiment of the present teaching. In an exemplary configuration as shown in FIG. 13A, the back of the truck 1300 may be installed with a camera 1310 that has field of view with respect to the front of the trailer 1320. On the front surface of the trailer, a fiducial marker 1330 may be provided with certain known visual characteristics. For example, on fiducial marker 1330, there are visible, high contrast feature points such as corner points, 90 degree concave points, 90 degree convex feature points, symmetric features, etc. FIG. 13B shows an opposite configuration between the camera and fiducial marker, i.e., the camera 1310 is now installed on the front surface of the trailer, looking at the fiducial marker 1330 on the back surface of the truck.

Figure 13C:
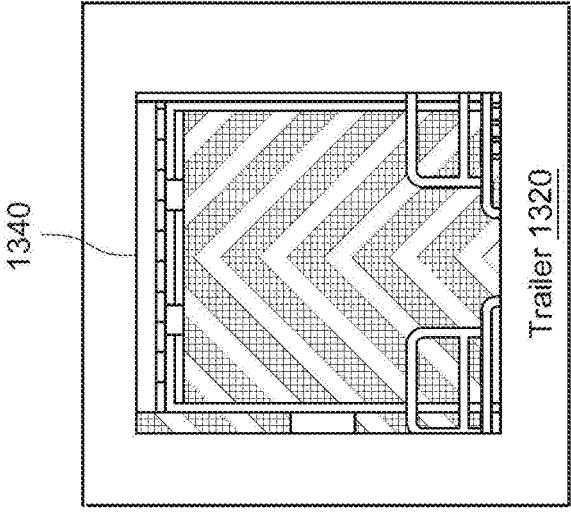
Figure 13C:
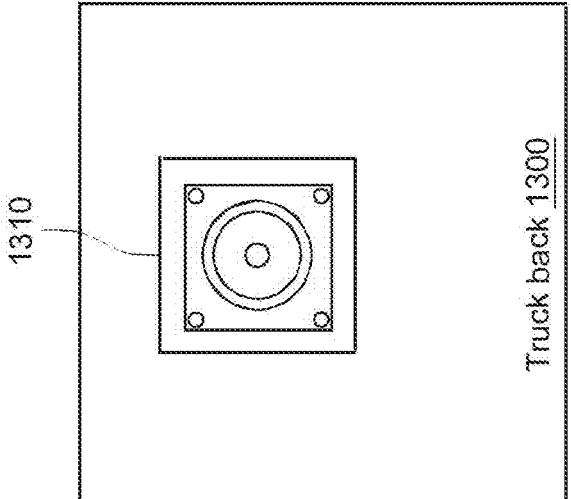

In some embodiments, visual features characterizing a surface of either a truck (back of a truck) or a trailer (front of a trailer) may be used directly instead of relying on visual features of a target placed on the opposing surface. FIGS. 13C-13D show different configurations of using a part of a surface of a truck or a trailer for trailer pose estimation, in accordance with an embodiment of the present teaching. As shown in FIG. 6B, the back of a truck may provide various visual cues that can be used to determine the transformation. The visual cues in FIG. 6B include high contrast of different stripes as well as meeting points of such strips. Other parts of the truck back may also be used as visual cues to be detected and used in estimating the transformation. Such visual target may also be present in a front surface of a trailer such as what is shown in FIG. 13C. In some embodiments, such a target may preferably have some structural characteristics with different features points that have certain known spatial relationships which may be exploited for the purpose of pose estimation. Similarly, in some alternative embodiments, the camera 1310 may be installed on the front surface of the trailer when the back of the truck 1300 has certain built-in visual target with known visual features so that the observed actual features from the visual target on the back of the truck 1300 may be utilized to estimate the pose. This is shown in FIG. 13D. When the camera is installed on the front surface of the trailer, its orientation may be determined in different ways. For instance, an inertial measurement unit may be used in connection with the camera which reports the camera's pose with respect to the trailer's surface or edge points. In some embodiments, if the mount of the camera is solid, the mounting pose (position and orientation) may be used.

As discussed herein, to use a target's visual features to estimate the transformation H, it may require that reference features be known. With such reference or ground truth features, the observed corresponding features may then be compared to determine, e.g., what is the transformation to be applied in order for the actual observed visual features to match with the known reference or ground truth features or vice versa. As discussed herein, once the transformation is determined, critical point(s) representing the pose of the trailer (e.g., center point or corner points 1220-1, . . . , 1220-8) may be computed based on known dimensions of the trailer. With this approach, the truck 1210 may continuously monitor the pose of a trailer connected thereto while both the truck and the trailer are in motion. The ground truth or reference features may be from the initial setting when the truck and the trailer are in alignment in a straight line. In this case, the trailer's pose is determined based on a transformation from the initial position when the trailer is aligned with the truck. In some situations, the reference features may be from a previous positions of the truck/trailer so that the pose estimated for the trailer may correspond to a change in its pose as compared with its prior pose via transformation as discussed herein. In such situations, the reference features used for estimating the trailer's next pose may be updated regularly to provide the reference at a prior point of time.

Figure 14A:
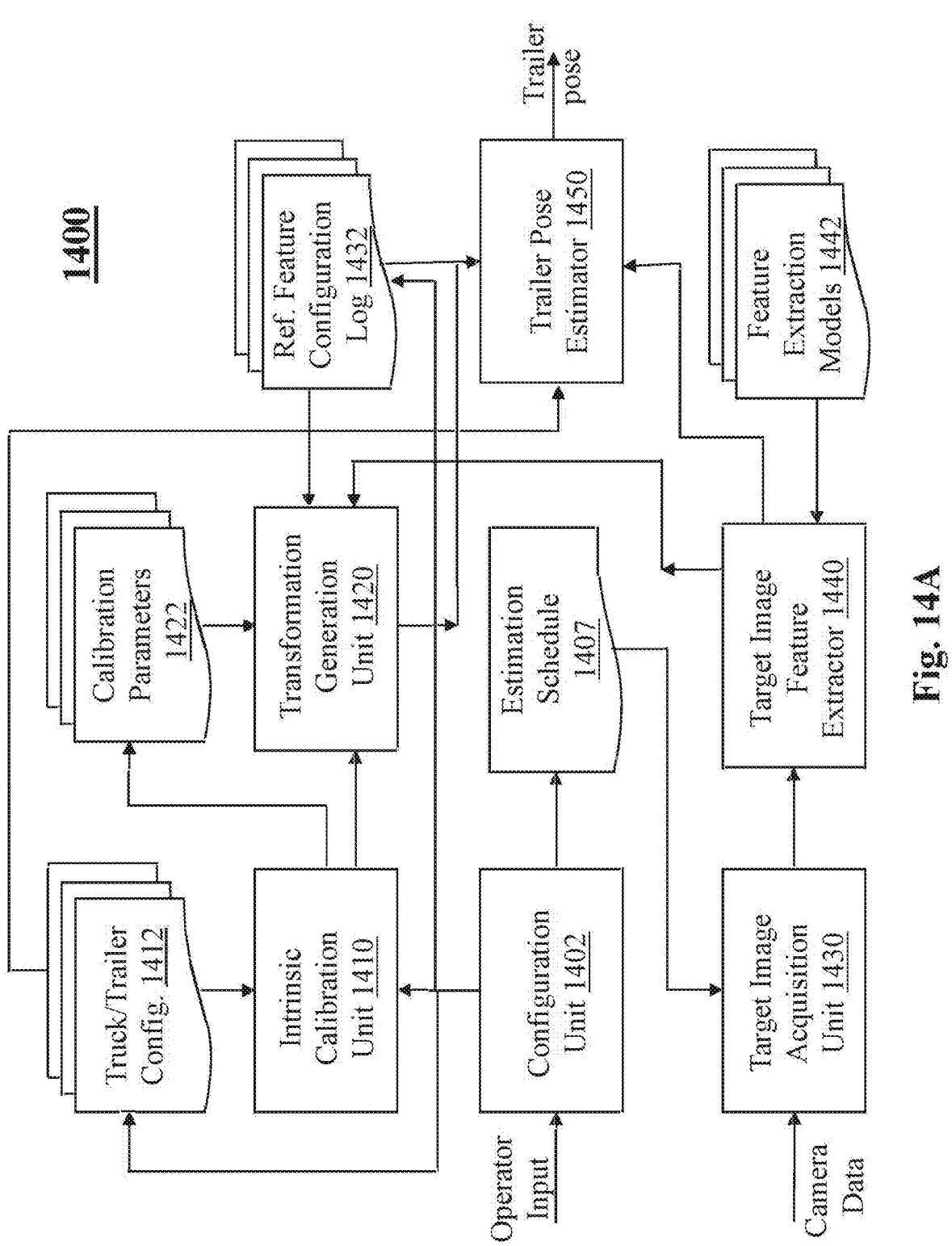
FIG. 14A depicts an exemplary high level system diagram of a framework for estimating a pose of a trailer on-the-fly, in accordance with an embodiment of the present teaching.

FIG. 14A depicts an exemplary high level system diagram of a framework 1400 for estimating trailer pose on-the-fly, in accordance with an embodiment of the present teaching. In this illustrated embodiment, the framework 1400 comprises a configuration unit 1402, an intrinsic calibration unit 1410, a transformation generation unit 1420, a target image acquisition unit 1430, a target image feature extractor 1440, and a trailer pose estimator 1450. The operation of the framework 1400 may comprise two stages. On stage corresponds to an offline stage in which camera installed on one surface (either the back surface of the truck or the front surface of the trailer) is used to capture the visual features of a target on an opposing surface (either a posted target on the opposing surface or a portion of the opposing surface). While the camera is being calibrated at this stage, target features are generated and used to compute calibration parameters. Target features may include feature points observable in the target and/or the spatial relationships among the feature points. The configuration unit 1402 and the intrinsic calibration unit 1410 are provided for facilitating the calibration in this first stage.

Another stage corresponds to an online process for estimating trailer's pose while the truck/trailer are both in motion. This online process of estimating the pose of the trailer at each particular moment is to facilitate autonomous driving. To do so, the calibrated camera acquires real time images of the target on the opposing surface and such images are used to detect feature points. In certain situations, e.g., when the truck is making a turn, as illustrated in FIG. 12C, the feature points detected from the real time acquired images may have morphed to have different image coordinates and the spatial relationships among such feature points will also differ from that among the feature points detected during calibration. As discussed herein, using the feature points of images acquired and the reference feature points, the transformation matrix H or h may be in the online processing. The target image acquisition unit 1430, the target image feature extractor 1440, the transformation generation unit 1420, and the trailer pose estimator 1450 are provided for the processing during the online operation.

FIG. 14B is a flowchart of an exemplary process of the framework 1400 for estimating a trailer's pose on-the-fly, in accordance with an embodiment of the present teaching. In this illustrated embodiment, to achieve the offline operation, an operator specifies, at 1405, e.g., via an interface of the configuration unit 1402, various types of information needed for calibration, such as parameters related to the truck/trailer configuration, the dimension information, . . . . This may include types of the truck and the trailer involved, the width/length/height of the trailer, the position and the length of the connector 1215, etc. The truck/trailer configuration related information may be stored in a truck/trailer dimension configuration log 1412 and can be used by the intrinsic calibration unit 1410 to carry out, at 1415, the calibration of the intrinsic camera.

The calibration may be carried out under certain specified conditions, e.g., the truck and the trailer may be in alignment. During the calibration, various visual feature points may be extracted and the spatial relationship among such feature points may be identified. Such feature points and the spatial relationships among them represent what the intrinsic camera should see of the target at a reference point when the truck/trailer is configured in a certain way. In some embodiments, the calibration parameters and reference features may be stored, at 1425, in a calibration parameter database 1422 and a reference feature configuration log 1432, respectively.

With the camera calibrated and the calibration results (calibration parameters) and reference features stored, when the truck and attached trailer are in motion, such stored information can be used to estimate trailer's pose on-the-fly in order to facilitate vehicle control to ensure proper behavior of the truck and trailer, e.g., traveling in the same lane. To do so, a schedule for how frequent to monitor the pose of the trailer may be set up at 1435, e.g., by an operator via the configuration unit 1400. Such a set schedule may be stored in an estimation schedule log 1407 so that it may be accessed by the target image acquisition unit 1430 to determine when to acquire an image of the target on the opposing surface to facilitate online estimation of trailer's pose. In some embodiments, the schedule may correspond to a fixed interval. In some embodiments, the schedule may be set as dynamic, e.g., when there is no change in direction (e.g., no lane change, no turning), trailer pose is estimated at a first frequency (lower) and when the truck/trailer are in the process of changing lanes, the trailer pose is estimated at a second (e.g., much higher) frequency. In some embodiments, the schedule may be set as adaptive with respect to some qualitative evaluation of, e.g., speed change which may be used as a trigger to adapt the trailer pose estimation operation. For example, if the truck is slowing down, the frequency of estimating the trailer pose may increase.

With the estimation schedule set, when the truck/trailer are on the road (in motion), the online estimation of the trailer's pose is performed based on the estimation schedule determined, e.g., by in the estimation schedule log 1407. An image of the target is acquired, by the target image acquisition unit 1430 at 1445, according to the estimation schedule and features are extracted, at 1455, by the target image feature extractor 1440 from the target image corresponding to the reference target features specified by information stored in log 1432. Such extracted features are sent to the transformation generation unit 1420 to estimate, at 1475, the transformation between the reference features and the extracted features. In some embodiments, the reference features may be from the calibration stage. In some embodiments, the reference features may be from a previous estimation step or a previously time instant. Such reference features and dimension information may be retrieved, at 1465, to estimate, at 1475, the transformation matrix. The estimated transformation matrix may then be sent to the trailer pose estimator 1450 to estimate, at 1485, the pose of the trailer based on the extracted features from the acquired image and the reference features stored in 1432. Once estimated, it then outputs, at 1495, the estimated trailer pose to facilitate autonomous driving of the truck and the trailer.

Figure 15:
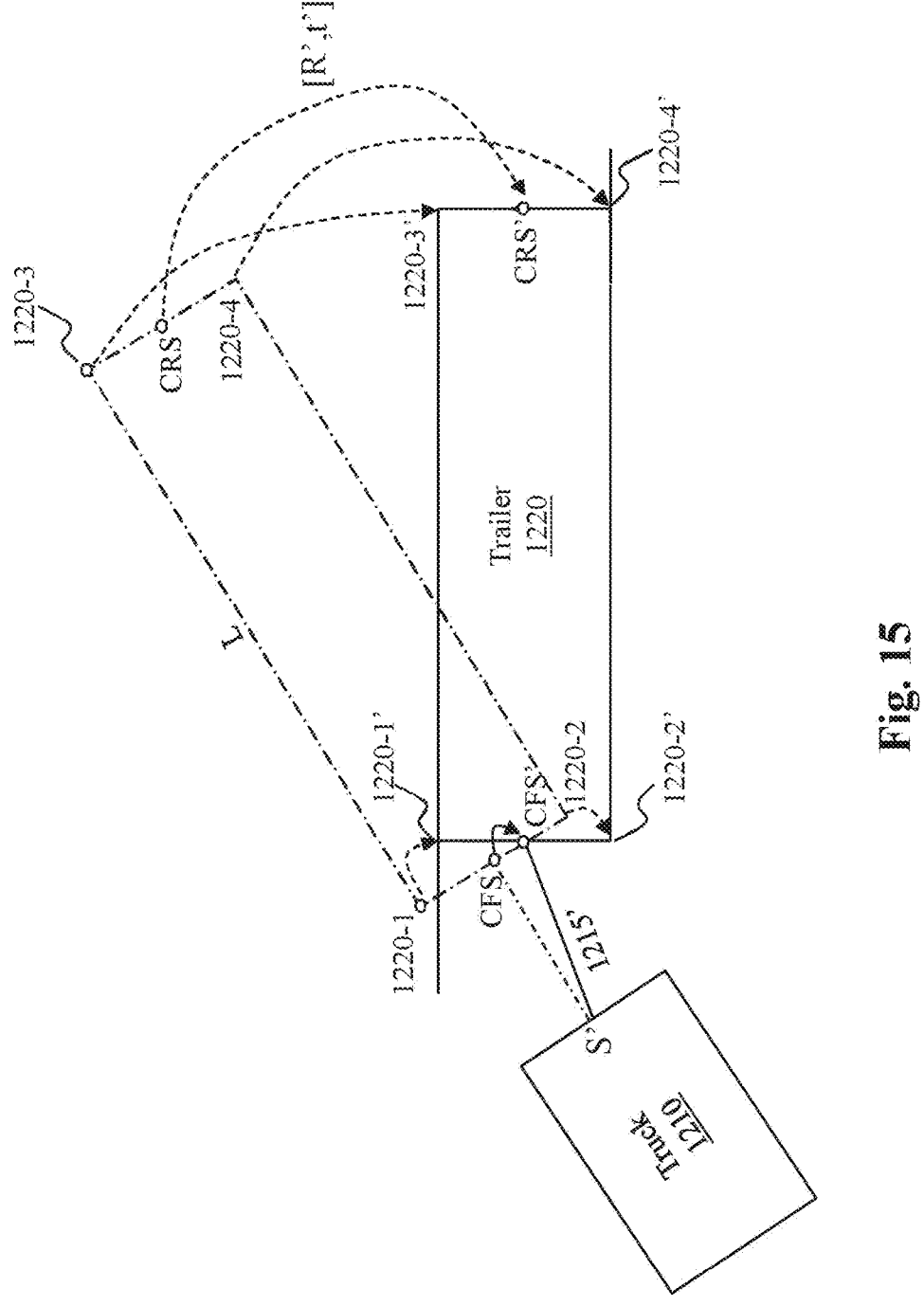
FIG. 15 illustrates visually the concept of estimating a trailer's pose based on fiducial target used in a truck/trailer configuration, in accordance with an embodiment of the present teaching.

FIG. 15 illustrates the concept of trailer pose estimation on-the-fly, in accordance with an embodiment of the present teaching. As shown herein, there are two poses of the trailer 1220, one having a center point at CFS at the initial pose and the other having a center point at CFS' at a second pose. As discussed herein, based on the camera transformation [R, t] estimated based on two sets of feature points, any critical point(s) on the trailer at the initial pose may be mapped to transformed position(s) using [R', t'], which represents trailer transformation computed from [R, t] to derive the current pose of the trailer. For instance, if a center point at the rear face of the trailer (CRS) is a critical point, given an estimated trailer transformation as described herein, the center point at CRS at a prior point of time may be mapped to a center point at CRS' at a current point of time (see FIG. 15A) via equations (7) and (8). Similarly, any other critical points used to represent the trailer pose may also be computed in the similar way by mapping, using [R', t'] from their initial positions or pose (e.g., 1220-3, 1220-4) to their current positions or pose (e.g., 1220-3', 1220-4') at a later point of time. In this way, the truck may obtain on a continuous basis the updated pose of the trailer and use such dynamic pose information to control the autonomous driving so that the truck and trailer are in the spatial region in a coherent and consistent manner.

Figure 16:
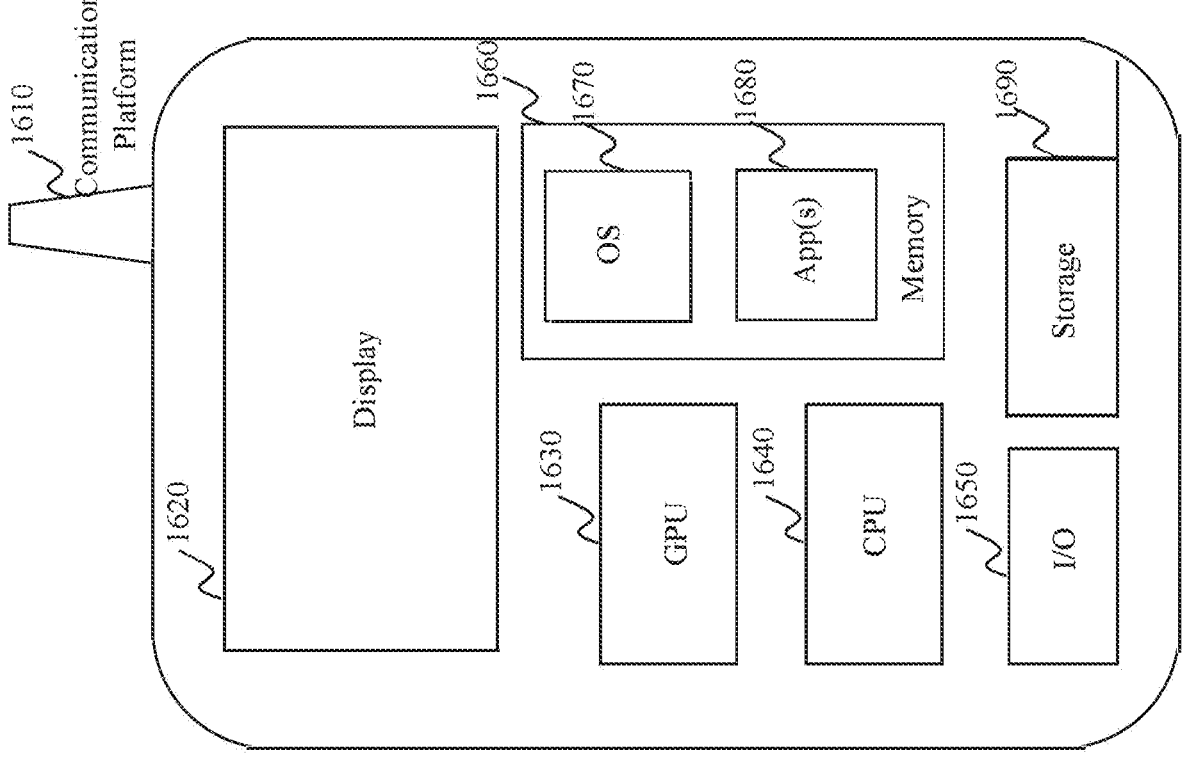
FIG. 16 is an illustrative diagram of an exemplary mobile device architecture that may be used to realize a specialized system implementing the present teaching in accordance with various embodiments.

FIG. 16 is an illustrative diagram of an exemplary mobile device architecture that may be used to realize a specialized system implementing the methods of protecting sensors and sensor assembly as disclosed in the present teaching in accordance with various embodiments. In this example, a device on which the present teaching is implemented corresponds to a mobile device 1600, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1600 may include one or more central processing units ("CPUs") 1660, one or more graphic processing units ("GPUs") 1630, a display 1620, a memory 1660, a communication platform 1610, such as a wireless communication module, storage 1690, and one or more input/output (I/O) devices 1640. Any other suitable component, including but not limited to a system bus or a controller (not shown), may also be included in the mobile device 1600. As shown in FIG. 16 a mobile operating system 1670 (e.g., iOS, Android, Windows Phone, etc.), and one or more applications 1680 may be loaded into memory 1660 from storage 1690 in order to be executed by the CPU 1640. The applications 1680 may include suitable mobile apps for managing the tasks related to the present teaching on mobile device 1600. User interactions may be achieved via the I/O devices 1640.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming and general operation of such computer equipment and as a result the drawings should be self-explanatory.

Figure 17:
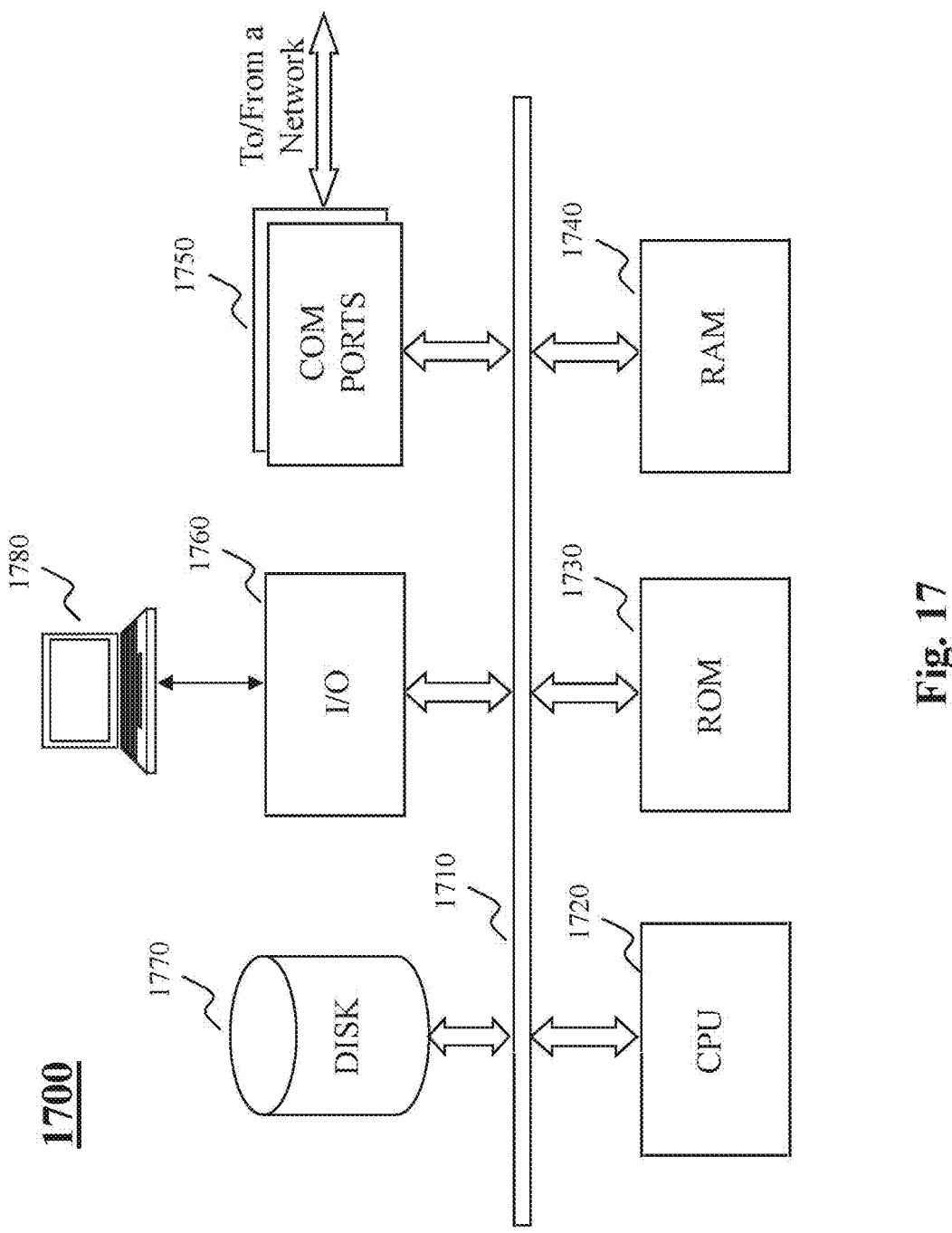
FIG. 17 is an illustrative diagram of an exemplary computing device architecture that may be used to realize a specialized system implementing the present teaching in accordance with various embodiments.

FIG. 17 is an illustrative diagram of an exemplary computing device architecture that may be used to realize a specialized system implementing various functionalities related to the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1700 may be used to implement any component of conversation or dialogue management system, as described herein. For example, various functions associated with the present teaching may be implemented on a computer such as computer 1900, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 1700, for example, includes COM ports 1750 connected to and from a network connected thereto to facilitate data communications. Computer 1700 also includes a central processing unit (CPU) 1720, in the form of one or more processors, for executing program instructions. The exemplary computer platform includes an internal communication bus 1710, program storage and data storage of different forms (e.g., disk 1770, read only memory (ROM) 1730, or random access memory (RAM) 1740), for various data files to be processed and/or communicated by computer 1700, as well as possibly program instructions to be executed by CPU 1720. Computer 1700 also includes an I/O component 1760, supporting input/output flows between the computer and other components therein such as user interface elements 1780. Computer 1700 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A computer-implemented method comprising:
   receiving, by a computing system, a request, from a first vehicle traveling on a road, for assistance in collaborative calibration of multiple sensors of the first vehicle;
   identifying, by the computing system, from a vehicle information database, an assisting vehicle;
   generating, by the computing system, an assistance plan in response to the request to facilitate the collaborative calibration of the multiple sensors, the assistance plan specifying (1) a sequence in which the multiple sensors on the first vehicle are to be calibrated and (2) a sequence of movements of at least one of the first vehicle and the assisting vehicle to calibrate the multiple sensors in the sequence, the assistance plan generated by a management center; and
   causing, by the computing system, execution of the collaborative calibration of the multiple sensors by the first vehicle and the assisting vehicle, the causing execution of the collaborative calibration comprising:
      sending, by the computing system, the assistance plan to initiate the collaborative calibration, and
      coordinating, by the computing system, remote communications and maneuvers between the first vehicle and the assisting vehicle.

2. The computer-implemented method of claim 1, further comprising:
   determining, by the computing system, a route for the assisting vehicle to travel to the first vehicle.

3. The computer-implemented method of claim 1, wherein:
   the request for assistance in collaborative calibration includes a first position of the first vehicle.

4. The computer-implemented method of claim 3, further comprising:
   identifying, by the computing system, the assisting vehicle based on the first position and a second position associated with the assisting vehicle.

5. The computer-implemented method of claim 1, further comprising:
   identifying, by the computing system, the assisting vehicle based on whether the assisting vehicle has one or more calibration targets thereon that can be used to calibrate the multiple sensors.

6. The computer-implemented method of claim 5, further comprising:
   identifying, by the computing system, the assisting vehicle based on types of the one or more calibration targets and locations of the one or more calibration targets on the assisting vehicle.

7. The computer-implemented method of claim 1, further comprising:
   receiving, by the computing system, the request for assistance in collaborative calibration when the first vehicle determines that a sensor deployed thereon needs to be calibrated.

8. The computer-implemented method of claim 1, wherein:
   the assisting vehicle is a member of a fleet that the first vehicle belongs to as a member.

9. The computer-implemented method of claim 1, wherein:
   the assistance plan is to facilitate the collaborative calibration of the multiple sensors while the assisting vehicle and the first vehicle are traveling together on the road.

10. The computer-implemented method of claim 1, wherein sending the assistance plan to initiate the collaborative calibration comprises:
   sending the assistance plan to at least one of (1) the first vehicle to enable the first vehicle to initiate the collaborative calibration with the assisting vehicle or (2) the assisting vehicle to enable the assisting vehicle to coordinate with the first vehicle to carry out the collaborative calibration.

11. A non-transitory computer-readable storage medium including instructions that, when executed by at least one processor of a computing system, causes the computing system to perform operations comprising:
   receiving a request, from a first vehicle traveling on a road, for assistance in collaborative calibration of multiple sensors of the first vehicle;
   identifying from a vehicle information database, an assisting vehicle;
   generating an assistance plan in response to the request to facilitate the collaborative calibration of the multiple sensors, the assistance plan specifying (1) a sequence in which the multiple sensors on the first vehicle are to be calibrated and (2) a sequence of movements of at least one of the first vehicle and the assisting vehicle to calibrate the multiple sensors in the sequence, the assistance plan generated by a management center; and
   causing execution of the collaborative calibration of the multiple sensors by the first vehicle and the assisting vehicle, the causing execution of the collaborative calibration comprising:
      sending the assistance plan to initiate the collaborative calibration, and
      coordinating remote communications and maneuvers between the first vehicle and the assisting vehicle.

12. The non-transitory computer-readable storage medium of claim 11, further comprising:
   determining a route for the assisting vehicle to travel to the first vehicle.

13. The non-transitory computer-readable storage medium of claim 11, wherein:
   the request for assistance in collaborative calibration includes a first position of the first vehicle.

14. The non-transitory computer-readable storage medium of claim 13, further comprising:

identifying the assisting vehicle based on the first position and a second position associated with the assisting vehicle.

15. The non-transitory computer-readable storage medium of claim 11, further comprising:

identifying the assisting vehicle based on whether the assisting vehicle has one or more calibration targets thereon that can be used to calibrate the multiple sensors.

16. A system for sensor calibration, comprising:

at least one processor; and a memory operably coupled to the at least one processor and storing instructions to cause the system to perform operations comprising:

receiving a request, from a first vehicle traveling on a road, for assistance in collaborative calibration of multiple sensors of the first vehicle;

identifying from a vehicle information database, an assisting vehicle;

generating an assistance plan in response to the request to facilitate the collaborative calibration of the multiple sensors, the assistance plan specifying (1) a sequence in which the multiple sensors on the first vehicle are to be calibrated and (2) a sequence of movements of at least one of the first vehicle and the assisting vehicle to calibrate the multiple sensors in the sequence, the assistance plan generated by a management center; and causing execution of the collaborative calibration of the multiple sensors by the first vehicle and the assisting vehicle, the causing execution of the collaborative calibration comprising:

sending the assistance plan to initiate the collaborative calibration, and coordinating remote communications and maneuvers between the first vehicle and the assisting vehicle.

17. The system of claim 16, further comprising:

determining a route for the assisting vehicle to travel to the first vehicle.

18. The system of claim 16, wherein:

the request for assistance in collaborative calibration includes a first position of the first vehicle.

19. The system of claim 18, further comprising:

identifying the assisting vehicle based on the first position and a second position associated with the assisting vehicle.

20. The system of claim 16, further comprising:

identifying the assisting vehicle based on whether the assisting vehicle has one or more calibration targets thereon that can be used to calibrate the multiple sensors.

* * * * *